United States Patent
Gibson et al.

(10) Patent No.: US 11,713,840 B2
(45) Date of Patent: Aug. 1, 2023

(54) SYSTEM AND METHOD OF RELEASABLY CONNECTING PIPE SECTIONS

(71) Applicant: TWIST4LOCK PTY LTD AS TRUSTEE OF THE T4L TRUST, Morisset (AU)

(72) Inventors: Stuart Gibson, Mandalong (AU); Peter Scott, Laguna (AU)

(73) Assignee: TWIST4LOCK PTY LTD, Morisset (AU), AS TRUSTEE OF THE T4L TRUST ( * ) Notice: Subject to any disclaimer, the term of this patent is extended or adjusted under 35 U.S.C. 154(b) by 13 days.

(21) Appl. No.: 17/168,602

(22) Filed: Feb. 5, 2021

(65) Prior Publication Data
US 2021/0262600 A1    Aug. 26, 2021

Related U.S. Application Data

(63) Continuation of application No. 15/507,236, filed as application No. PCT/AU2014/000850 on Aug. 27, 2014, now abandoned.

(51) Int. Cl.
| *F16L 37/252* | (2006.01) |
| *F16L 37/244* | (2006.01) |
| *F16L 55/16* | (2006.01) |
| *F16L 17/06* | (2006.01) |

(52) U.S. Cl.
CPC .......... *F16L 37/252* (2013.01); *F16L 37/244* (2013.01); *F16L 55/1608* (2013.01); *F16L 17/06* (2013.01)

(58) Field of Classification Search
CPC ....... F16L 37/252; F16L 17/06; F16L 37/107; F16L 37/244; F16L 55/1608; F16L 37/248; F16L 37/113
See application file for complete search history.

(56) References Cited

U.S. PATENT DOCUMENTS

| 692,795 | A | * | 2/1902 | Moyle | F16L 37/252 |
| | | | | | 285/361 |
| 2,165,163 | A | * | 7/1939 | Waters | F16L 37/113 |
| | | | | | 285/361 |
| 8,764,066 | B1 | * | 7/2014 | Rice | F16L 27/12 |
| | | | | | 285/302 |

FOREIGN PATENT DOCUMENTS

GB              931498 A  *  7/1963

* cited by examiner

Primary Examiner — Zachary T Dragicevich
Assistant Examiner — James A Linford

(57) ABSTRACT

A pipe fitting system, including a first pipe section with at least one male end, a second pipe section with at least one female end, and a connecting means for releasably connecting the pipe sections together such that the male end is at least partially received within the female end. The connecting means comprising releasably engageable first and second connectors associated with the first and second pipe sections respectively, wherein the first connector comprises at least one outwardly extending protrusion and wherein the second connector comprises corresponding recesses adapted to releasable receive the or each protrusion of the first connector. The pipe fitting system is suitable for applications such as end of line connections, repair/replacement of fixed existing pipes, and in enabling temporary removal of pipes for maintenance or access purposes.

17 Claims, 20 Drawing Sheets

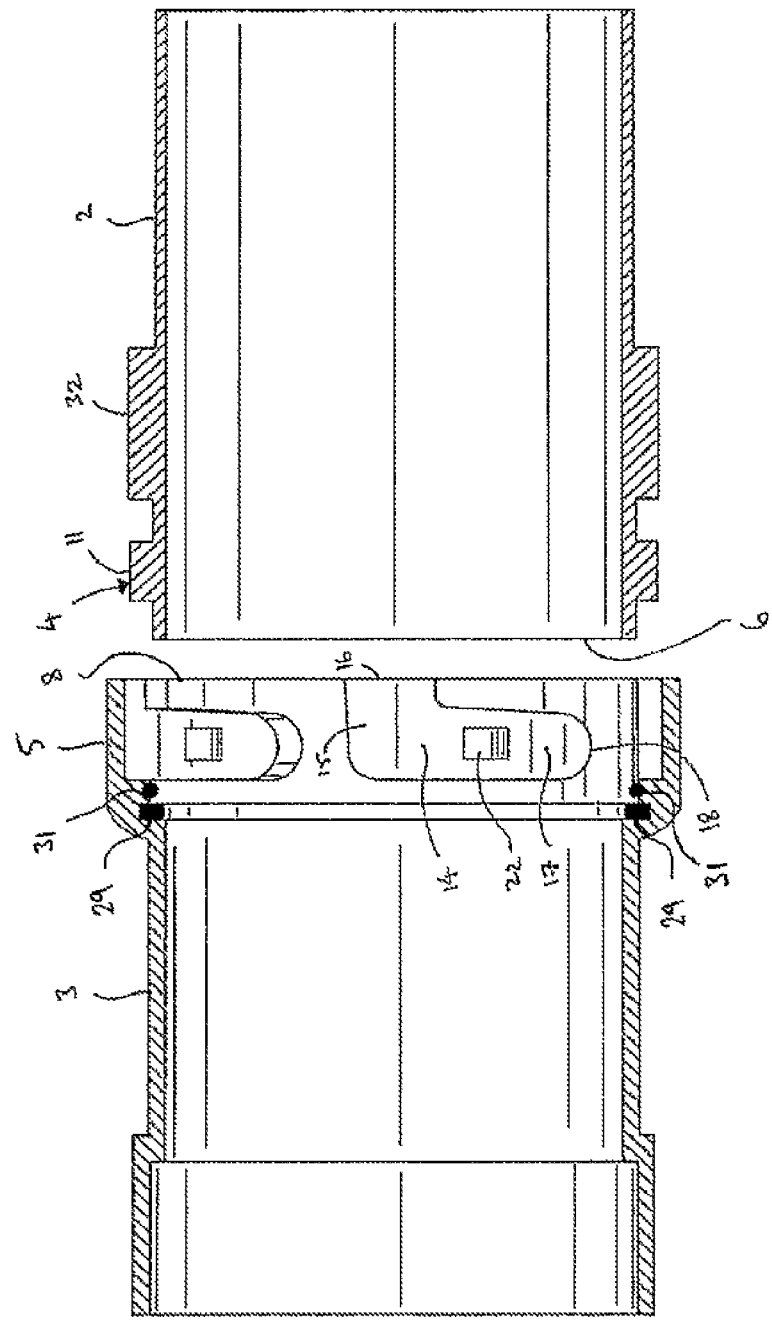

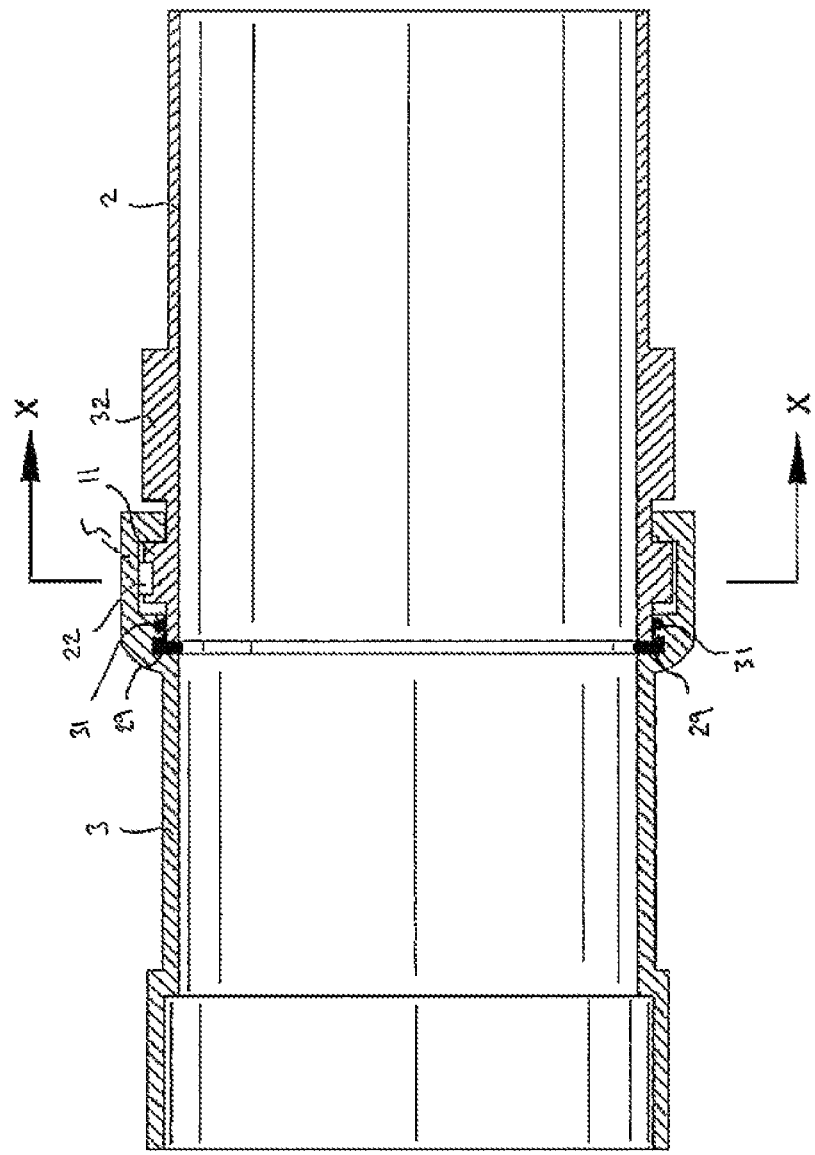

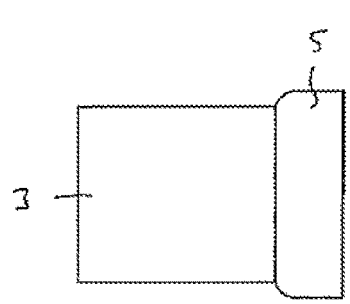
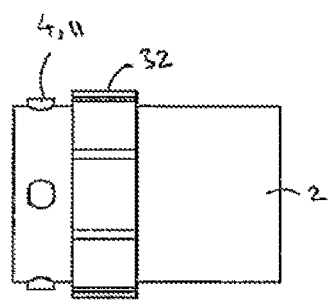
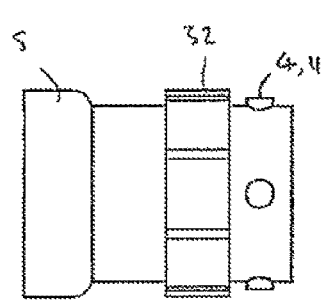
Fig. 9A     Fig. 9B     Fig. 9C
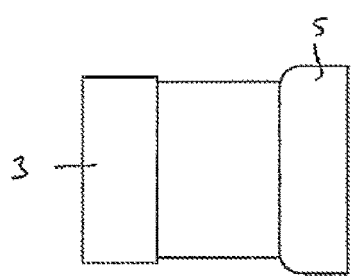
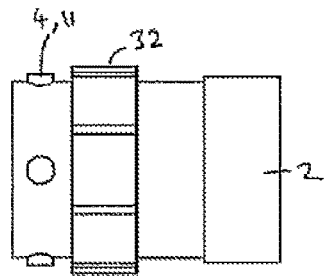
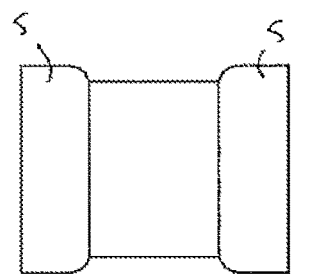
Fig. 9D     Fig. 9E     Fig. 9F
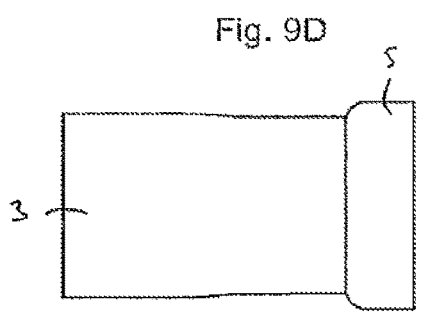
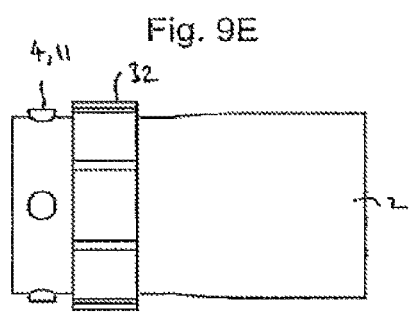
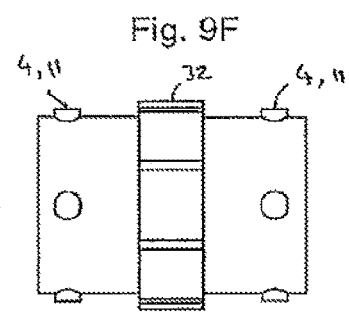
Fig. 9G     Fig. 9H     Fig. 9I
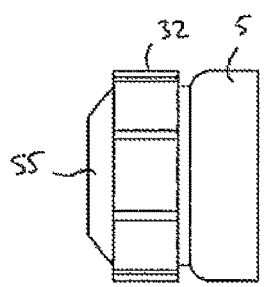
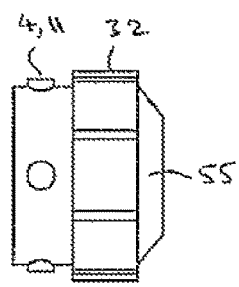
Fig. 9J     Fig. 9K

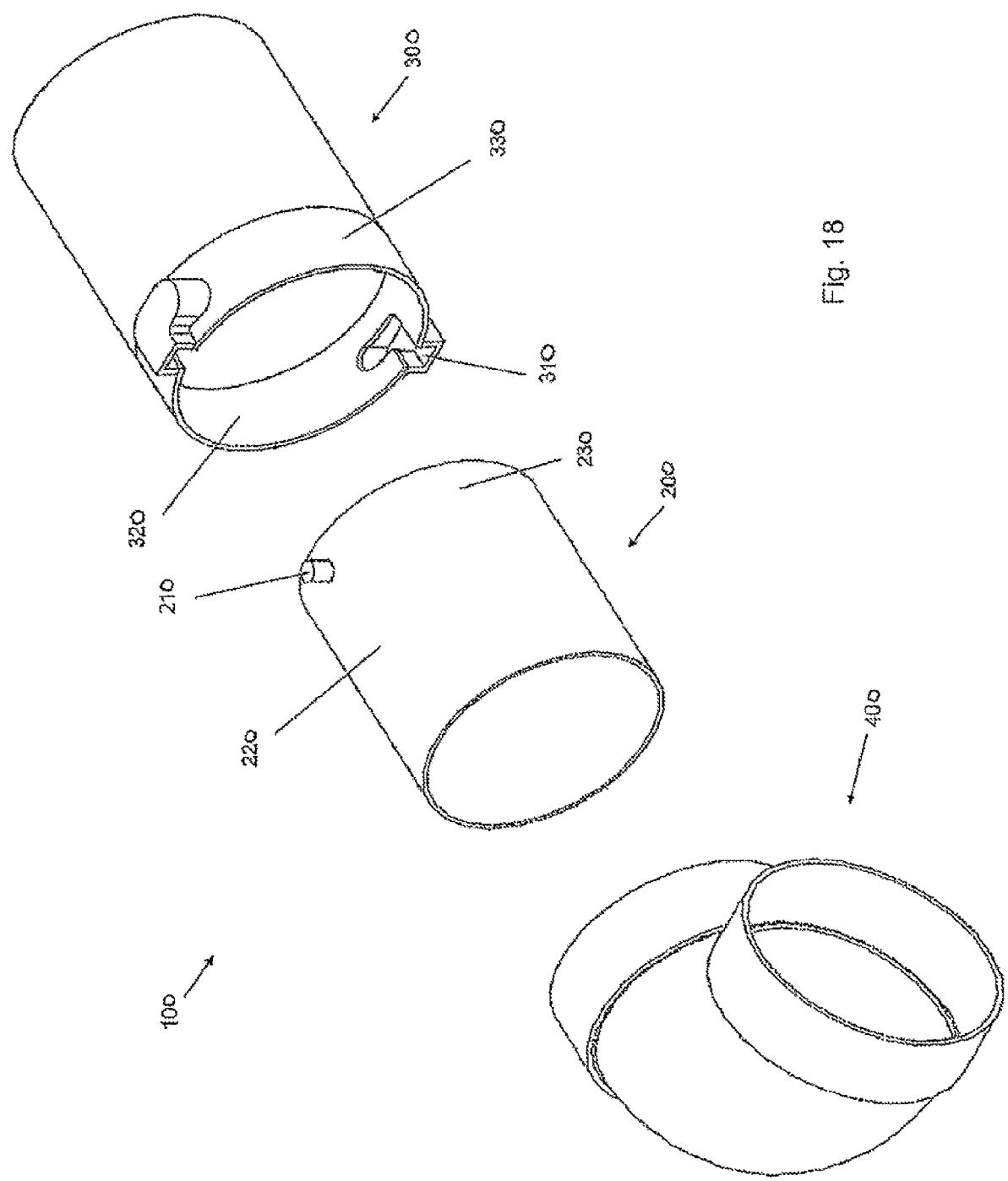

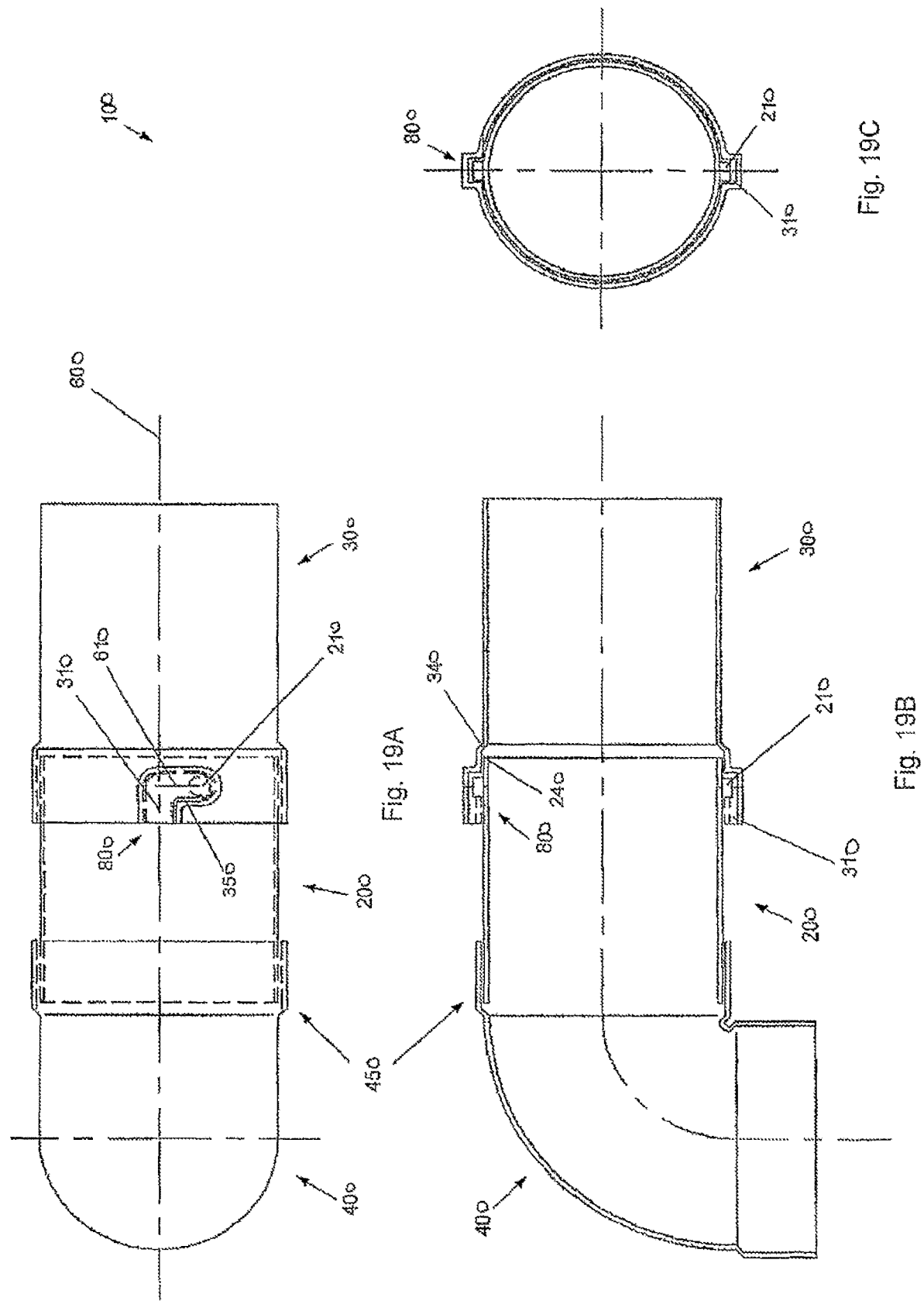

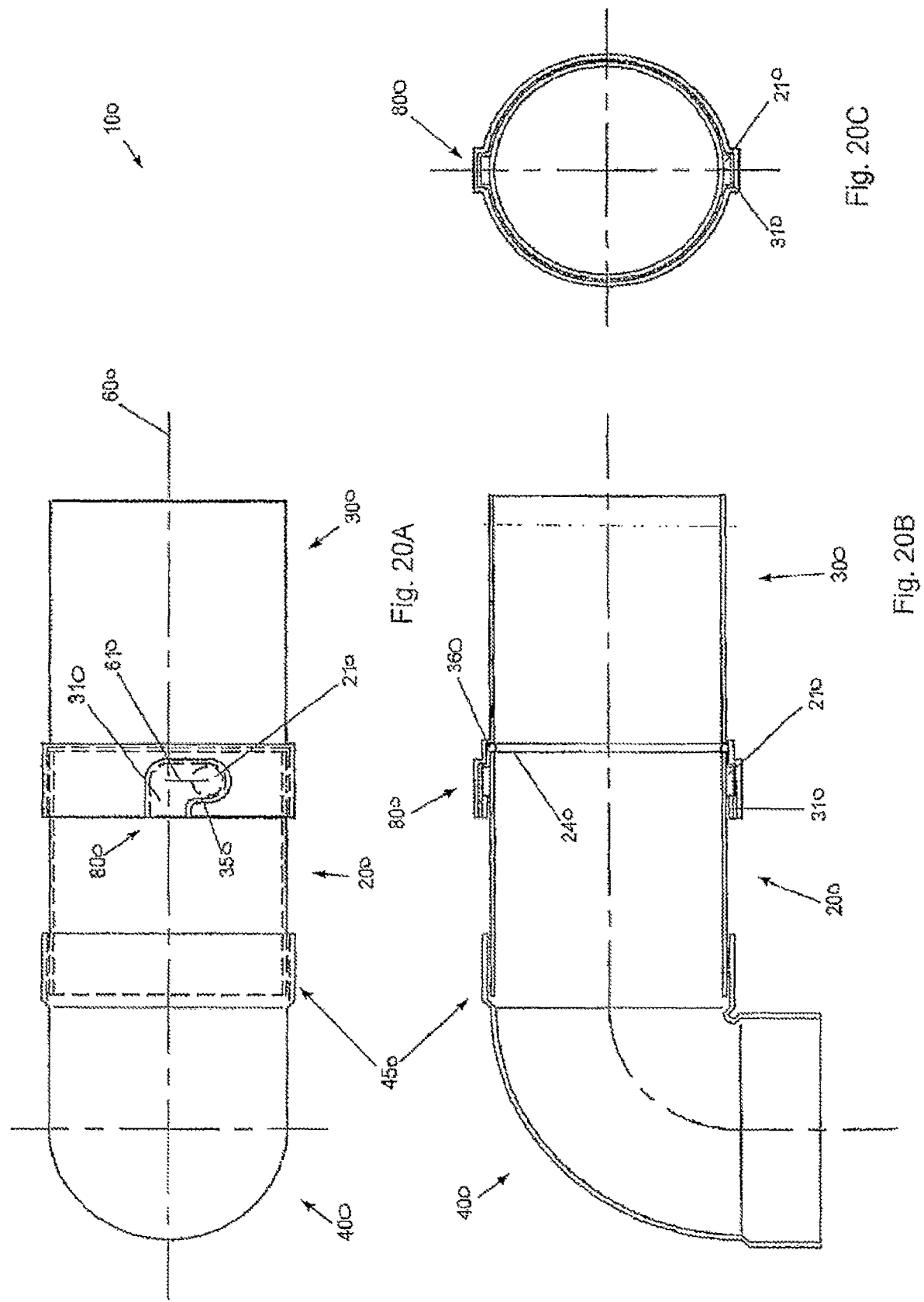

SYSTEM AND METHOD OF RELEASABLY CONNECTING PIPE SECTIONS

RELATED APPLICATIONS

This application is a continuation of U.S. application Ser. No. 15/507,236, filed Jan. 15, 2018, which is a U.S. National Stage Entry of PCT/AU2014/000850, filed Aug. 27, 2014, which are incorporated herein by reference for all purposes.

FIELD OF THE INVENTION

The present invention relates generally to pipes and pipe fittings for directing and controlling the flow of fluids, and more specifically to releasably connectable pipe fittings and related components.

The invention has been developed primarily as a pipe fitting system for releasably connecting sections of pipe to simplify end of line connections, repair/replacement of existing fixed pipes, and to facilitate temporary removal of pipes for maintenance or access purposes, and will be described predominantly in this context. It should be appreciated, however, that the invention is not limited to this particular field of use, being potentially applicable to a broad range of other piping applications at residential, commercial and industrial sites, including other fluid collection/transfer systems (including systems for liquids, gases, and particulate material), drainage systems, data and energy transfer systems, for example. It is also to be understood that the invention has application in both pressure (charged) and gravity flow (uncharged) fluid systems.

BACKGROUND TO THE INVENTION

The following description of the prior art is intended to place the invention in an appropriate technical context and enable the advantages of it to be more fully appreciated. However, any references to prior art should not be construed as an express or implied admission that such art is widely known or forms part of common general knowledge in the relevant field.

There are many varied applications in which pipes and pipe fittings are connected together to form a pipeline for controlling the flow of fluids. One particular application relates to water tanks which are arranged next to residential, commercial and industrial buildings such as, for example, residential homes, public school buildings and rural properties.

The use of water tanks is rapidly growing as communities become increasingly aware of the importance of minimising water usage and wastage. Changes to environmental conditions, including extended periods of drought, have led to a growing awareness of the limited water supply available for consumption. In an effort to address water supply problems, a number of governments and councils have imposed building regulations requiring a water tank to be installed on site at new building developments.

Water tanks are commonly installed around buildings as a convenient way of capturing rain water runoff, enabling the water to be reused around the building and reducing the amount of water which flows to the municipal storm water drainage systems. Typically, a water tank is installed such that water is harvested from stormwater runoff, with a downpipe or other drain feeding directly to an opening at the top of the water tank. The opening at the top of the tank may have a strainer or some other means of filtering dirt, leaves or other foreign matter from the water entering the tank.

Regular access to the strainer or to the tank via the opening is required for maintenance, repair, cleaning or other purposes. The location of the stormwater piping directly outside or above the opening, however, can restrict this access, requiring at least part of the stormwater piping to be removed before conducting these activities. The access to openings such as strainers is often further reduced where the outlet of two or more pipes are arranged over a single opening.

Traditionally, it has been necessary to cut out and remove the section or sections of piping which is obstructing access to the location where works are to be carried out, e.g. above the strainer of a water tank. After the task has been completed, the removed section of stormwater piping is then rejoined. To rejoin the piping which has been removed, it is common to mount slip-on fittings to the existing pipes and glue the removed pipe section to these fittings. The use of glue often results in an untidy finish which detracts from the appearance of the building or the property as a whole, particularly when the procedure has been repeated numerous times. In addition, the requirement to cut out a section of pipe and rejoin this section in the manner described above is relatively labour intensive, timing consuming and requires additional fittings and pipe sections to be used for simple and routine cleaning and maintenance procedures.

Another method for joining sections of pipe includes the use of rubber sleeve-type couplings held in place and sealed by hose clamps. This method has a number of inherent disadvantages including a relatively short working life. These rubber sleeve couplings are typically used in fixed pipe installations, including in the ground systems and systems held by brackets to a structure. When exposed to a range of harsh environmental conditions, the rubber portion deteriorates rapidly and the metal portion corrodes. For visually exposed systems, this method detracts from the appearance of the building or the property as a whole.

Pipe structures are commonly formed using slip-on fittings which are glued together. This method is often messy (inside and outside the pipe), time consuming, and highly frustrating for the constructor. When used in temporary situations such as, for example, in building sites where the entire pipe structure must be removed, it is common that no pipe components or fittings are able to be reused, resulting in undesirably high levels of wastage and associated costs.

It is an object of the present invention in one or more of its various aspects, to overcome or substantially ameliorate one or more of the deficiencies of the prior art, or at least to provide a useful alternative.

SUMMARY OF THE INVENTION

According to a first aspect of the invention, there is provided a pipe fitting system, including:
  a first pipe section;
  a second pipe section; and
  a connecting means for releasably connecting the first pipe section and the second pipe section together.

Preferably, the first pipe section has at least one male end. In some embodiments, the first pipe section has two male ends. In other embodiments, the first pipe section has one male end and one female end. In yet other embodiments, the first pipe section has two female ends.

The second pipe section preferably has at least one female end. In some embodiments, the second pipe section has two female ends. In other embodiments, the second pipe section has one male end and one female end. In yet other embodiments, the second pipe section has two male ends.

For the sake of clarity, the following description will be made with reference to the first pipe section having at least one male end, and the second pipe section having at least one female end.

Preferably, the connecting means is configured such that, when the first pipe section and the second pipe section are connected together, via the connecting means, the male end of the first pipe section is at least partially received within the female end of the second pipe section.

In certain embodiments, the first pipe section is a straight pipe fitting. In other embodiments, the first pipe section is an angled pipe fitting. In some preferred embodiments, the angled pipe fitting is configured such that the opposed ends of the first pipe section are arranged at one of, for example, 5, 15, 22.5, 30, 42, 45, 88 and 90 degrees with respect to each other.

Preferably, the first pipe section has a hollow body defining a passage through which fluid can flow, from one end of the first pipe section to the other end. In some embodiments, the internal passage of the body has a substantially constant cross-sectional area. In certain embodiments, the cross-sectional area of the body is circular.

It will be appreciated that the body of the first pipe section is not limited to having a constant cross-sectional area, rather the cross-sectional area may vary along the length of the body of the fitting, including, for example, a gradual or progressive change along the length of the body (or a portion thereof) or a stepwise change. It will also be appreciated that the cross-sectional area is not limited to being circular in shape, rather the shape of the cross-section may be any suitable shape, including regular and irregular polygonal shapes, for the particular application in which the pipe fitting will be employed.

Where the first pipe section is a straight pipe fitting, the body is preferably a straight length of pipe. Where the first pipe section is an angled pipe fitting, the body is preferably an angled, curved, or otherwise bent length of pipe. In other forms, the angled pipe fitting may have a straight body with the ends angled relative to one another. In such forms, one end of the body may be angled relative to the longitudinal axis of the body, whilst the other end is substantially orthogonal to the longitudinal axis. In other forms, both ends may be angled relative to the longitudinal axis of the body.

In certain embodiments, the second pipe section is a straight pipe fitting. In other embodiments, the second pipe section is an angled pipe fitting. In some preferred embodiments, the angled pipe fitting is configured such that the opposed ends of the second pipe section are arranged at one of, for example, 5, 15, 22.5, 30, 42, 45, 88 and 90 degrees with respect to each other.

Preferably, the second pipe section has a hollow body defining a passage through which fluid can flow, from one end of the second pipe section to the other end. In some embodiments, at least a portion (e.g. a middle portion) of the internal passage of the body has a substantially constant cross-sectional area. In certain embodiments, the cross-sectional area of the body is circular.

It will be appreciated that the body of the second pipe section is not limited to having a constant cross-sectional area, rather the cross-sectional area may vary along the length of the body of the fitting, including a gradual or progressive change along the length of the body (or portion thereof) or a stepwise change. It will also be appreciated that the cross-sectional area is not limited to being circular in shape, rather the shape of the cross-section may be any suitable shape, including regular and irregular polygonal shapes, for the particular application in which the pipe fitting will be employed.

Where the second pipe section is a straight pipe fitting, the body is preferably a straight length of pipe. Where the second pipe section is an angled pipe fitting, the body is preferably an angled, curved, or otherwise bent length of pipe. In other forms, the angled pipe fitting may have a straight body with the ends angled relative to one another. In such forms, one end of the body may be angled relative to the longitudinal axis of the body, whilst the other end is substantially orthogonal to the longitudinal axis. In other forms, both ends may be angled relative to the longitudinal axis of the body.

In some embodiments, the first and second pipe sections are configured to have internal bores that are configured such that, when the two pipe sections are connected together, the internal passage extending through both pipe sections is generally of constant cross-sectional shape so as not to disrupt flow, thereby reducing turbulent flow within the connected pipe sections.

In certain embodiments, the first and section pipe sections are configured to have an internal diameter in the range of approximately 1 mm to 1000 mm, more preferably 35 mm to 700 mm, still more preferably 90 mm to 300 mm. In some embodiments, the internal diameter is, for example, one of 10 mm, 20 mm, 35 mm, 50 mm, 65 mm, 90 mm, 100 mm, 200 mm, 250 mm, 300 mm, 350 mm and 600 mm. It will be appreciated by those skilled in the art that the first and second pipe sections are not limited to having internal diameters with those exemplary diameters listed above, but may be any suitable diameter for the application in which the pipe fitting system will be employed.

In some embodiments, the connecting means includes a first connector associated with the first pipe section, and a second connector associated with the second pipe section, wherein the first and second connectors are releasably engagable with one another to thereby connect the first and second pipe sections together (to form at least a section of pipeline). Preferably, the connecting means is configured to connect the first pipe section and the second pipe section in end-to-end relation, more preferably mating end-to-end relation.

The first connector is preferably integrally formed with the body of the first pipe section as a one-piece unit. Preferably, the second connector is integrally formed with the body of the second pipe section as a one-piece unit. In certain other embodiments, the first and second connectors may be attachable (fixedly or releasably) to the body of the respective first and second pipe sections.

Preferably, the first connector is arranged on, or adjacent to, an end of the first pipe section. In some embodiments, the first pipe section has a male end and the first connector is arranged on the male end.

Preferably, the second connector is arranged on, or adjacent to, an end of the second pipe section. In some embodiments, the second pipe section has a female end and the second connector is arranged on the female end.

In certain embodiments, the first connector includes at least one protrusion extending from a surface of the male end of the first pipe section, the protrusion being adapted to releasably engage the second connector. Preferably, the at least one protrusion extends outwardly from an outer surface of the male end. In other embodiments, the at least one protrusion extends inwardly from an inner surface of a female end of the first pipe section.

In certain preferred embodiments, the first connector has two or more protrusions. It will be appreciated that the number of protrusions can be selected to suit the particular application in which the pipe fitting system is to be employed. For example, the number of protrusions may be selected depending on the size and/or shape of the pipe fitting sections, or to provide desired structural characteristics to the joint connection between the first and second pipe section. It has been found that a greater number of protrusions can provide advantages in terms of enhanced reliability and stability at the connection between two pipe sections. In some embodiments, the first connector may have, for example, 1, 2, 3, 4, 5, 6, 7, 8, 9, 10 or more protrusions. Again, it will be appreciated that the number of protrusions is not limited to those exemplary numbers listed above, rather the number of protrusions can be selected for desired performance requirements, as required. It has also been found that advantages arise in connection with angular fittings, where an increased number (e.g. three or more) of protrusions are arranged at the male end of the first pipe section, in terms of enabling a corresponding increase in the number of discrete angular increments in which the angular pipe section can be connected.

The one or more protrusions of the first connector are preferably arranged symmetrically about the outer surface of the male end from which they extend. The protrusions are preferably arranged to extend radially from the outer surface of the male end. In some embodiments, each protrusion is in the form of a stud, spigot, lug, rib, bayonet or other suitable raised formation. In some embodiments, each protrusion may be generally oval shaped, circular, or obround in cross-section, having rounded end profiles and generally flat side faces. Preferably, the protrusion is arranged such that the flat side faces of the protrusion extend in a circumferential direction around the outer surface of the male end of the first pipe section. In certain embodiments, the flat side edges may be parallel to each other, or may be angled with respect to each other. In some embodiments, the flat side edge furthest from the free edge of the male end is substantially parallel to the free edge, and the flat edge closest to the free edge is angled relative to the free edge.

In certain embodiments, the second connector includes at least one receiving formation associated with the female end of the second pipe section, the receiving formation being adapted to releasably receive the or each protrusion of the first connector. Preferably, the receiving formation is associated with an inner surface of the female end of the second pipe section. Preferably, the second connector is configured such that an outer surface of the second pipe section has a generally smooth profile (i.e. the second connector does not impact on the profile of the outer surface of the second pipe section). In other embodiments, the receiving formation may be associated with an outer surface of a male end of the respective pipe section.

In some embodiments, the receiving formation is generally in the form of a recess, socket, slot, groove, notch, channel or other suitable formation for receiving a protrusion of the first connector. The receiving formation is preferably configured such that the number of recesses on the second connector corresponds with the number of protrusions on the first connector. That is, the connecting means preferably includes discrete pairs of protrusions and recesses. It has been found in various embodiments it may be advantageous to have two or more pairs of protrusions and recesses as the increased number of pairs can give rise to improved sealing performance and structural stability to the connecting (coupling) means. In certain embodiments, the or each recess is substantially L-shaped. Each recess is preferably an open-ended recess. Preferably, each open-ended recess includes a first arm segment extending from an opening at a free end face of the female end of the second pipe section, and a second arm segment extending transversely from a distal end of the first arm segment to a closed end. In some embodiments, the second arm segment advantageously extends so as to be inclined away from the free end of the pipe section so that, during rotation, the first and second pipe sections are drawn together to improve the sealing connection therebetween.

The free open end of the first arm enables the respective protrusion to be received within the recess, upon relative axial movement between the first and second pipe sections towards one another. The extent of axial movement is limited by an innermost side wall of the second pipe section extending transversely to the first arm segment.

The second arm segment preferably extends a predetermined distance in a generally circumferential direction along the inner surface of the female end of the second pipe section, thereby facilitating relative rotational movement between the first and second pipe sections when the protrusion is received within the second arm of the recess. The closed end of the second arm segment limits the extent of rotational movement between the first and second pipe sections, and defines the engaged position. In certain embodiments, the length of the second arm segment is such that the extent of rotational movement between the first and second pipe sections is limited to less than 90 degrees.

Preferably, the closed end of the second arm segment of the recess is configured to be of complementary shape to that of the respective protrusion. In some embodiments, side edges of the second arm segment may be substantially parallel to each other, or may be angled with respect to each other. In some embodiments, the side edge of the second arm segment furthest from the free end of the second pipe section is substantially parallel to the free end, and the flat edge closest to the free edge is angled relative to the free edge. Preferably, the angled side edge of the second arm segment is angled so as to substantially correspond to the angled side edge of the protrusion, thereby enabling substantially face-to-face sliding engagement with each other when the first and second pipe sections are rotated relative to one another.

In some embodiments, one or more of the receiving formations has a positive locking member, the positive locking member being arranged to restrain the first and second pipe sections against rotational displacement away from the engaged position. Preferably, each recess includes a positive locking member. The positive locking member is preferably arranged within the second arm segment of the recess, the positive locking member being spaced from the closed end such that the protrusion can be captively retained between the closed end of the second arm segment and the positive locking member (i.e. in the engaged position). In some embodiments, the spacing between the positive locking member and the closed end may be such that there may be some degree of rotational play when the protrusion is in the engaged position. In other embodiments, there may be a substantially size-for-size relationship between the spacing and the circumferential length of the protrusion such that a tight or close-fit is provided with substantially no rotational play between the pipe sections.

In certain embodiments, the positive locking member is generally in the form of a raised member such as, for example, a ramp, dimple, or the like. In some embodiments, the positive locking member is a locking ramp having a first ramp wall facing generally towards the open end of the recess, and a second ramp wall facing generally towards the closed end of the recess.

Preferably, the locking ramp is configured such that, upon rotational movement between first and second pipe sections towards the engaged position, the protrusion abuts the first ramp wall, whereby further rotation causes the male end carrying the protrusion to resiliently deform enabling the protrusion to slide along the first ramp wall, and past the locking ramp into the engaged position. It will be appreciated that the protrusion and locking ramp act in combination to provide a snap-locking mechanism for securely retaining the first and second pipe sections together. In certain embodiments, the snap-locking mechanism advantageously provides a tactile and/or audible signal, indicating when the first and second pipe sections are secured in the engaged position, and when the pipe sections are released from the engaged position.

Preferably, the locking ramp has a peak where the first and second locking ramps meet. The peak is preferably configured (e.g. curved) to facilitate movement of the protrusion past the peak of the locking ramp, during movement to and from the engaged position.

Preferably, the first ramp wall has a different profile to that of the second ramp wall. The different ramp profiles are preferably configured to provide different shaped obstructions with corresponding different levels of resistance to movement of the protrusion past the locking ramp. In some embodiments, the first ramp wall provides less resistance during connection of the first and pipe sections, relative to the resistance provided when disconnecting the pipe sections. In some embodiments, the first ramp wall extends from a floor of the recess to the peak of the locking ramp at a generally constant gradient or slope. In some embodiments, the second ramp wall has a steeper gradient to that of the first ramp wall, thereby providing relatively greater resistance to movement of the protrusion past the locking ramp. In certain embodiments, the second ramp wall may have a first portion extending from, and generally orthogonally to, the floor of the recess, and a second angled or curved portion extending from the first position to the peak of the locking ramp.

Preferably, each receiving formation of the second connector is configured to act on the respective protrusion of the first connector such that, upon relative rotation between the first and second pipe sections, the first and second pipe sections are positively driven towards one another in an axial direction. In certain embodiments, the angled side faces of the protrusion and second arm segment of the recess are adapted to provide this positive driving action on the first and second pipe sections. It will be appreciated that the positive driving action facilitates in achieving a sealing engagement between the free end face of the male end of the first pipe section and an inner seat formed within an interior of the female end of the second pipe section.

Preferably, the inner surface of the female end of the second pipe section has a stepped profile. In some embodiments, the inner surface has a two step profile. Preferably, the stepped profile defines the seat for limiting inward axial movement of the male end of the first pipe section into the female end. In certain embodiments, the step may be tapered. In other embodiments, the seat may be substantially square to the free end face of the male end of the first pipe section. In some embodiments, the free end face of the male end abuts against the inner seat in face-to-face sealing engagement.

In some embodiments, the female end of the second pipe section houses a sealing means for providing a seal between the first and second pipe sections, when the pipe sections are in the engaged position.

In some embodiments, the sealing means includes a primary seal arranged within the female end of the second pipe section and adapted to sealing engage a first face (e.g. the free end face) of the male end of the first pipe section. Preferably, the primary seal is located on or adjacent to the seat formed within the female end of the second pipe section. The female end preferably includes a seal retaining formation in which the primary seal is seated. Preferably, the seal retaining formation is a notch or groove extending circumferentially within the interior of the female end of the second pipe section. In certain embodiments, the seal retaining formation has a generally C, U- or J-shaped cross-sectional profile. Preferably, the cross-sectional profile is complementary in shape to that of the primary seal. In some embodiments, the primary seal is a washer, gasket, o-ring or the like. Preferably, the washer is annular. In some embodiments, the washer may have a stepped cross-section profile forming a shoulder which facilitates locating and/or retaining the washer within the seal retaining formation. Preferably, the primary seal is resiliently compressible.

In some embodiments, the sealing means includes a secondary seal arranged within the female end of the second pipe section and adapted to sealingly engage a second face (e.g. an outer side face) of the male end of the first pipe section. Preferably, the first and second faces are substantially orthogonal to one another. In some embodiments, the first face is substantially orthogonal to the longitudinal axis of the pipe section and the second face is substantially parallel to the longitudinal axis. The secondary seal is preferably spaced from the primary seal. Preferably, the secondary seal is closer to the free end of the female end of the second pipe section than the primary seal. The female end preferably includes a second seal retaining formation in which the secondary seal is located. Preferably, the secondary seal retaining formation is a notch or groove extending circumferentially within the interior of the female end of the second pipe section. In certain embodiments, the seal retaining formation has a generally C-, U- or J-shaped cross-sectional profile. Preferably, the cross-sectional profile is complementary in shape to that of the secondary seal. The secondary seal is preferably an o-ring, washer, gasket or the like. Preferably, the secondary seal is resiliently compressible.

The protrusions of the first connector are preferably spaced back from the free edge of the male end to provide a continuous/uninterrupted edge that can abut the seat or primary seal within the female end, when in the engaged position.

Preferably, the first pipe section is formed from a substantially rigid material, more preferably a rigid plastics material. In some preferred embodiments, the first pipe section is formed from a thermoplastic material such as, for example, polyvinylchloride (PVC) or polyethylene (PE).

Preferably, the second pipe section is formed from a substantially rigid material, more preferably a rigid plastics material. In some preferred embodiments, the second pipe section is formed from a thermoplastic material such as, for example, polyvinylchloride (PVC) or polyethylene (PE).

It will be appreciated that the first and second pipe sections are not limited to the materials listed above and may be formed from other suitable materials such as, for example, fibreglass.

In this specification, the term "rigid" is to be understood, in the context of the first and second pipe sections, to encompass some degree of resilient deformation of the pipe sections when connecting the pipe sections, or disconnecting them from each other.

Preferably, the first pipe section includes a gripping formation for facilitating grasping of the first pipe section during connection and disconnection with the second pipe section. The gripping formation is preferably adapted to enable a greater lever or turning force to be applied to the first pipe body. In certain embodiments, the gripping formation is configured as a handgrip. In other embodiments, the gripping formation is adapted to provide a lever point for a mechanical lever. In some preferred embodiments, the gripping formation is configured such that it can be used as a handgrip and/or as lever point for a mechanical lever. In some such embodiments, it is envisaged that the gripping formation may be used as a handgrip when securing the first and second pipe sections together, and a lever point when disconnecting the first and second pipe sections, or vice versa.

In some embodiments, the gripping formation extends circumferentially around the outer surface of the body of the first pipe section. Preferably, the gripping formation is arranged between the centre of the body and the first connector. In some embodiments, the gripping formation is a continuous band extending circumferentially about the body of the first pipe section. In other embodiments, the gripping formation is an interrupted formation, having discrete gripping elements. In some preferred embodiments, the continuous band includes a raised rib extending circumferentially about the body, and a plurality of gripping elements arranged in spaced relation about the rib. In some embodiments, the gripping elements may be formed as notches or grooves, or as a raised element, which preferably extend axially across the band (i.e. substantially parallel to the longitudinal axis of the first pipe section). In yet other embodiments, the gripping elements may form a criss-cross, zig-zag, or other suitable pattern. Preferably, the notches are evenly spaced about the circumferential rib. In some particularly preferred embodiments, there are four pairs of notches spaced about the rib. In other embodiments, the spacing between a pair of notches may be less than or more than the spacing between adjacent pairs of notches.

Preferably, the gripping elements (e.g. notches) are offset with respect to the protrusions of the first connector on the male end of the first pipe section. It has been found that by offsetting the gripping elements with respect to the protrusions there is less stiffening of the male end of the first pipe section, thereby allowing the male end to resiliently deform to enable the protrusions to pass the positive locking member during connection and disconnection of the first and second pipe sections. In other embodiments, the gripping elements may be substantially in line with the protrusions of the first connector.

In some embodiments, the mechanical lever may have an elongate lever arm with an engaging formation at its distal end for engaging at least at portion of the gripping formation. Preferably, the engaging formation is adapted to (at least partially) engage with one or more of the gripping elements, wherein the gripping elements provide an anchor or pivot point for the mechanical lever. In some embodiments, the engaging formation includes two or more spaced apart prongs for engaging respective notches in the circumferential gripping band. Preferably, the prongs are of complementary configuration to that of the notches. In some particularly preferred embodiments, the engaging formation includes a base member at the distal end of the lever arm, the prongs being arranged on, and extending outwardly from, the base member. Preferably, the base member is curved so as to complement the shape of the circumferential rib, more preferably a portion of the curved outer portion of the rib. In some embodiments, the base member is generally semi-circular in shape. In certain embodiments, the semi-circular shaped base member carries five prongs.

It will be appreciated that the gripping formation will provide significant advantages to a wide range of embodiments, but will be particularly advantageous in those embodiments incorporating a positive locking member (e.g. locking ramp), where the positive locking member resists the free passage of the protrusion of the first connector to and from the engaged position.

In some embodiments, the first pipe section may have a male end with a first connecter at that end, as described herein. The other end of the first pipe section may also be configured to have a male end with a first connector, or a female end with a second connector as described herein. In other forms, the other end of the first pipe section may be configured as a slip-on fitting (male or female) which can, for example, be glued to another fitting or pipe. In some embodiments, the other end of the first pipe section may be configured with a threaded end (male/external thread or female/internal thread), such as for example a BSB thread.

In some embodiments, the second pipe section may have a female end with a second connecter at that end, as described herein. The other end of the second pipe section may also be configured to have a female end with a second connector, or a male end with a first connector as described herein. In other forms, the other end of the second pipe section may be configured as a slip-on fitting (male or female) which can, for example, be glued to another fitting or pipe. In some embodiments, the other end of the second pipe section may be configured with a threaded end (male/external thread or female/internal thread), such as for example like a BSB thread.

According to another aspect of the invention, there is provided a pipe fitting assembly, including:
  a body having a first open end and a second open end; and
    a first pipe member having an inner end and an outer end; wherein, the inner end of the first pipe member is telescopically received within the first open end of the body and adapted for sliding movement between a retracted position and an extended position, and the outer end has a first connecting means for releasably connecting the first pipe member to an upstream or downstream pipe section.

In some embodiments, the body is a substantially straight pipe section. In other embodiments, the body is an angled pipe section. In certain embodiments, the body is a T-shaped pipe section.

Preferably, a second pipe member has an inner end and an outer end, the inner end of the second pipe member is telescopically received within the second open end of the body and adapted for sliding movement between a retracted position and an extended position, and the outer end has a first connecting means for releasably connecting the second pipe member to a downstream or upstream pipe section.

The outer end of the first and second pipe members is preferably configured as a male end. It will of course be appreciated that one or both of the outer ends could be configured as female pipe ends.

The upstream and downstream pipe sections are preferably configured to have at least one female end to complement the male outer ends of the first and second pipe members. The female end of the upstream and downstream pipe sections preferably have a second connecting means releasably engagable with the first connecting means of the respective first and second pipe members.

The opposite end of the upstream and downstream pipe sections may be formed as a male or female end. Preferably, the opposite end of the upstream and downstream pipe sections is formed as a slip-on fitting (male or female) which can, for example, be glued to another fitting or pipe, or configured with a threaded end (male or female) like a BSP thread.

Preferably, the first connecting means of the first and second pipe members is in the form of a first connector as described herein. In some embodiments, the first connector has at least one protrusion extending from an outer surface of the male end of the first pipe member, the protrusion being adapted to releasably engage the second connecting means.

Preferably, the second connecting means of the upstream and downstream pipe sections is in the form of a second connector as described herein. In some embodiments, the second connector includes at least one receiving formation associated with the female end of the respective upstream and downstream pipe sections, the receiving formation being adapted to releasably receive the or each protrusion of the first connector. Preferably, the receiving formation is associated with an inner surface of the female end of the second pipe section.

Preferably, a sealing mechanism is arranged between the first open end of the body and the inner end of the first pipe member. The sealing mechanism is preferably configured to provide a seal between an inner surface of the first open end of the body and an outer surface of the inner end of the first pipe member. Preferably, the sealing mechanism configured to maintain the seal when the first pipe member is at or between the extended and retracted positions. In some embodiments, the sealing mechanism has at least one sealing member circumferentially arranged around the inner surface of the first open end of the body. In certain embodiments, the sealing mechanism has two or more sealing members. Preferably, the two or more sealing members are arranged in spaced apart side-by-side relation. In certain embodiments, the or each sealing member is in the form of a gasket, washer, o-ring or the like. Preferably, the inner surface of the first open end has a seal member retaining formation in which the sealing member is seated. Preferably, the seal member retaining formation is a notch or groove extending circumferentially within the interior of the female end of the second pipe section. Preferably, the cross-sectional profile is complementary in shape to that of the respective sealing member. Preferably, the or each sealing member is annular. Preferably, the or each sealing member is resiliently compressible.

Preferably, a sealing mechanism is arranged between the second open end of the body and the inner end of the second pipe member. The sealing mechanism is preferably configured to provide a seal between an inner surface of the second open end of the body and an outer surface of the inner end of the pipe member. Preferably, the sealing mechanism configured to maintain the seal when the pipe member is at or between the extended and retracted positions. In some embodiments, the sealing mechanism has at least one sealing member circumferentially arranged around the inner surface of the open end of the body. In certain embodiments, the sealing mechanism has two or more sealing members. Preferably, the two or more sealing members are arranged in spaced apart side-by-side relation. In certain embodiments, the or each sealing member is in the form of a gasket, washer, o-ring or the like. Preferably, the inner surface of the open end has a seal member retaining formation in which the sealing member is seated. Preferably, the seal member retaining formation is a notch or groove extending circumferentially within the interior of the female end of the second pipe section. Preferably, the cross-sectional profile is complementary in shape to that of the respective sealing member. Preferably, the or each sealing member is annular. Preferably, the or each sealing member is resiliently compressible.

Preferably, one or both of the first and second pipe members has a gripping formation adapted to facilitate grasping of the first pipe section during connection and disconnection with the second pipe section, thereby enabling a greater lever or turning force to be applied to the first pipe body. The gripping formation of the first and/or second pipe members may be configured as a handgrip and/or adapted to provide a lever point for a mechanical lever as described herein.

In some embodiments, the body is a T-shaped pipe section having a third opening, in addition to the first and second open ends. Preferably, the body has a main body section in which the first and second open ends are formed, and a leg extending transversely from the main body and in which the third opening is formed. In some embodiments, the third opening may provide an inspection portal for facilitating visual inspection into the main body, advantageously at an intermediate point between the first and second open ends.

Preferably, a cover or cap is releasably attached to the leg of the body to cover the third opening. The cover of cap is preferably threadedly engagable with the leg. Preferably, the leg has an external threaded portion and the cover or cap has an internal threaded portion, or vice versa. In other embodiments, the cover or cap may be releasably secured in or over the third opening by any suitable means other than by way of threaded connection, such as, for example, by an interference fit (e.g. plug). In other embodiments, the cover/cap and the third leg have respective first and second connectors (or vice versa) for releasably attaching the cap/cover to the leg of the body. For example, the third leg may be configured to have a female second connector as described herein, and the cap/cover has a male first connector as described herein to enable releasable connection between the cap and third leg.

In some embodiments, a branch line may be releasably connected to the third leg either directly or indirectly via a fitting as described herein, rather than a cap/cover. Again, respective first and second connectors as described herein may be used to enable the branch line to be releasably connected to the third leg.

Preferably, a gasket, washer or like sealing member is arranged to seat between the cap and the leg of the body to facilitate sealing engagement therebetween.

Advantageously, the first open end of the body and the first pipe member (and similarly the second open end of the body and the second pipe member) are preferably configured such that the inner end of the pipe members are clear of (i.e. do not overlap) the leg of the body when the pipe members are in the extended position, such that they do not obstruct a view path of the main body from the inspection portal. This non-overlapping arrangement is also advantageous in use when fluid is flowing through the pipe as it effectively keeps the passage way open and free of obstructions which would otherwise give rise to creating turbulent flow within the fluid stream as it moves past the junction of the third leg.

It will be appreciated that the adjustable length of the pipe fitting assembly together with the releasable connectors advantageously enables simple, clean and efficient repair or replacement of existing fixed pipes as it can be readily retrofitted between upstream and downstream pipes or pipe sections. In some embodiments, the adjustable length and releasable connectors enable the assembly, or a portion thereof, to be removable. For example, the pipe fitting assembly may be installed as part of a new pipe network or retrofitted to an existing network such that it enables adjoining pipes to be temporarily removed for maintenance, access or other purposes, as and when required.

In some embodiments, a stop may be arranged within the body for limiting the extent to which the first and/or second pipe members can retract into the body. In certain embodiments, a separate stop may be provided for the first and second pipe members, respectively. In other embodiments, the extent of inward travel of the first and/or second pipe members may be limited by the associated gripping formation, enabling the inner surface of the pipe members to be substantially smooth and free of obstructions which could give rise to undesirable turbulence flow.

According to another aspect of the invention, there is provided a first pipe section having at least one first connector as described herein. In certain embodiments, the first pipe section with the first connector can be configured as a male to male fitting, a male to female fitting, or a female to female fitting. In various embodiments, the first pipe section with the first connector can be configured as one of a straight fitting, an angled/elbow fitting, a reducer, a Y-fitting, a double-Y fitting, a T-fitting, a reducing T-fitting, a double door T-fitting, an offset fitting, a closed end cap/cover, and the like.

The opposite end of the first pipe section may be formed as a male or female end. In some embodiments, the opposite end of the first pipe section is formed as a slip-on fitting (male or female) which can, for example, be glued to another fitting or pipe, or configured with a threaded end (male or female) like a BSP thread. In other embodiments, the opposite end of the first pipe section has a first or second connector.

According to another aspect of the invention, there is provided a second pipe section having a second connector as described herein. In certain embodiments, the second pipe section with the second connector can be configured as a female to female fitting, a female to male fitting, or a female to female fitting. In various embodiments, the first pipe section with the first connector can be configured as one of a straight fitting, an angled/elbow fitting, a reducer, a Y-fitting, a double-Y fitting, a T-fitting, a reducing T-fitting, a double door T-fitting, an offset fitting, a closed end cap/cover, and the like.

The opposite end of the second pipe section may be formed as a male or female end. In some embodiments, the opposite end of the second pipe section is formed as a slip-on fitting (male or female) which can, for example, be glued to another fitting or pipe, or configured with a threaded end (male or female) like a BSP thread. In other embodiments, the opposite end of the second pipe section has a first or second connector.

According to another aspect of the invention, there is provided a pipe connection system for releasably connecting two pipe sections, the system including:
  a. a first pipe section with a male connecting portion;
  b. a second pipe section with a female connecting portion; and
  c. a locking means,
  d. wherein when the first pipe section and the second pipe section are in an engaged position the male connecting portion fits at least partially inside the female connecting portion and the locking means releasably retains the pipe sections in the engaged position.

In some embodiments, the locking means includes:
  e. at least one protrusion extending from an outside surface of the male connecting portion; and
  f. at least one recess on an inside surface of the female connecting portion, wherein the protrusion fits substantially inside the recess when in the retained position.

In another form, the locking means is arranged so that moving the pipe sections from a separated position to the retained position requires inserting the male connecting portion into the female connecting portion and then rotating one of the first or second pipe sections relative to the other section.

In another form, the locking means is arranged so that moving the pipe sections from the retained position to a separated position requires rotating one of the first or second pipe sections relative to the other section and then removing the male connecting portion from the female connecting portion.

According to another aspect of the invention, there is provided a method of releasably connecting pipes using a pipe fitting connection system substantially as herein described, the method including the step of connecting the first pipe section to the second pipe section by inserting the male portion into the female portion and then rotating one of the first or second pipe sections relative to the other pipe section.

According to another aspect of the invention, there is provided a method of releasably connecting pipes using a pipe fitting connection system substantially as herein described, the method including the step of removing the first pipe section from the second pipe section by rotating one of the male or female sections relative to the other section and then removing the male portion from the female portion.

BRIEF DESCRIPTION OF THE DRAWINGS

Preferred embodiments of the invention will now be described, by way of example only, with reference to the accompanying drawings, in which:

FIG. 5 shows a longitudinal section view of the pipe fitting system of FIG. 1 in the disconnected configuration;

FIG. 6 a longitudinal section view of the pipe fitting system of FIG. 1 in the connected configuration;

FIGS. 9A to 9K show various embodiments of pipe sections employing the first and/or second connectors;

FIG. 18 shows an exploded perspective view of another embodiment of a pipe connection according to the present invention;

FIGS. 19A to 19C show top, side and cross sectional views of another embodiment of a pipe fitting system;

FIGS. 20A to 20C show top, side and cross sectional views of another embodiment of a pipe fitting system with an O-ring; FIG. 21A shows the pipe sections in a retained position and FIG. 21B shows the pipe connection in a separated position to provide access to the water tank.

PREFERRED EMBODIMENTS OF THE INVENTION

Figure 1:
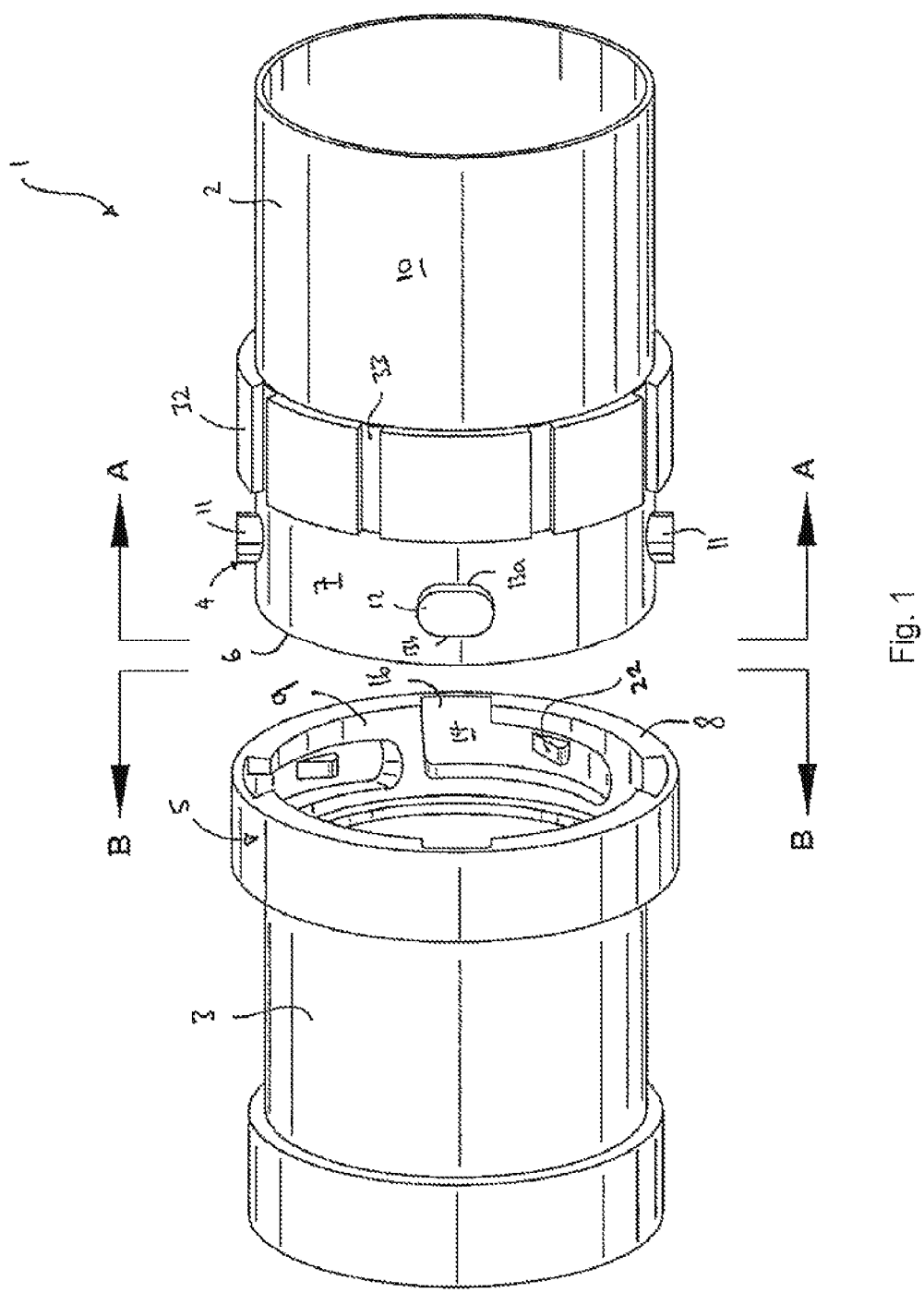
FIG. 1 shows a schematic perspective view of a first embodiment of a pipe fitting system according to the invention in a disconnected configuration.
Figure 2:
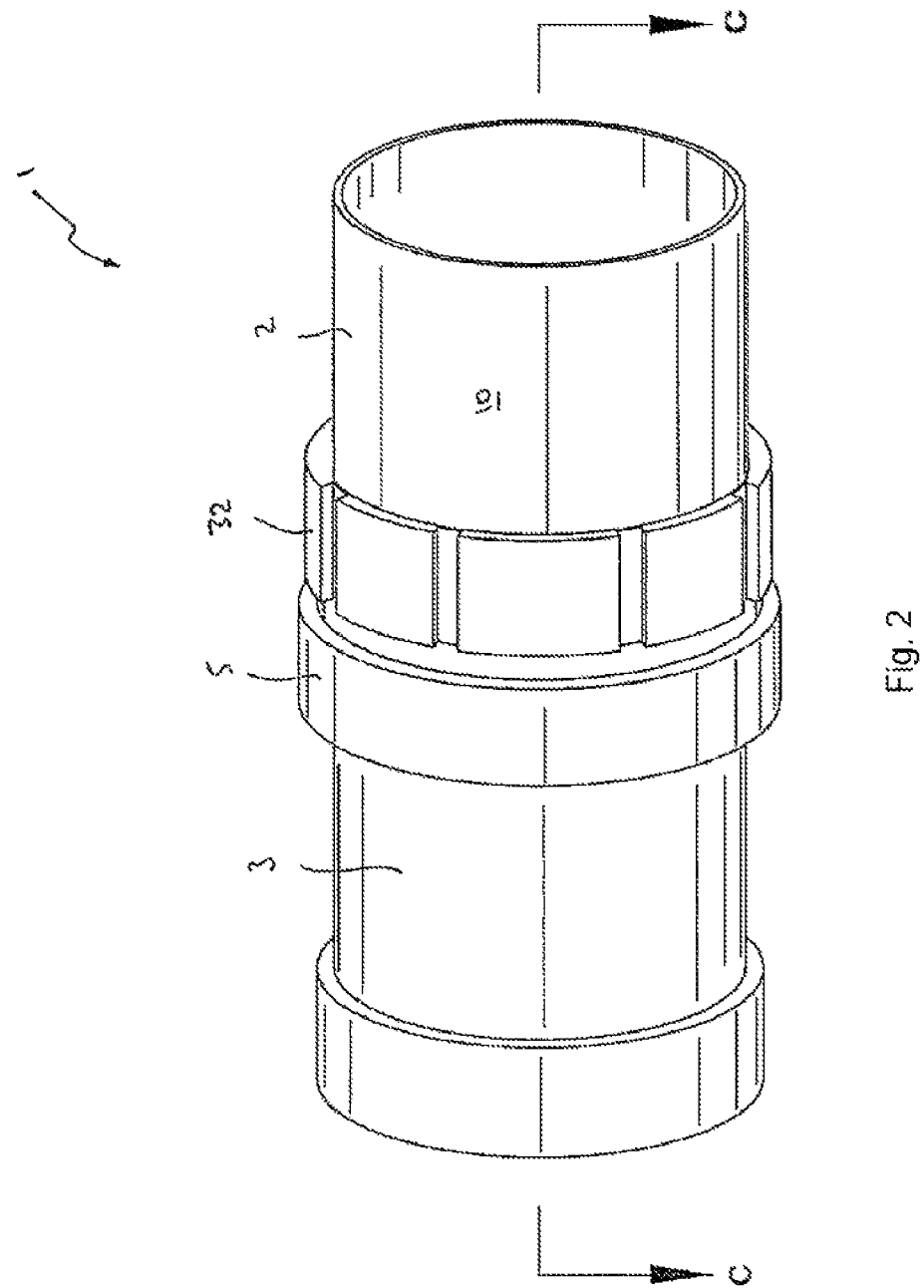
FIG. 2 the pipe fitting system of FIG. 1 in a connected configuration.

Referring to the drawings, the invention provides a pipe fitting system 1 having a first pipe section 2 and a second pipe section 3. A connecting means having a first connector 4 associated with the first pipe section 2 and a second connector 5 associated with the second pipe section 3 is provided for releasably connecting the first and second pipe sections (2, 3) together.

For the sake of clarity of description, the following description of the illustrated embodiments of the pipe fitting system 1 will be made with reference to the first pipe section 2 having a male end 6 with an outer surface 7 on which the first connector 4 is located. The description will also refer to the second pipe section 3 having a female end 8 with an inner surface 9 on which the second connector 5 is located. It will be appreciated that the invention is not limited to this exemplary arrangement which is provided by way of example only.

Referring to the embodiment illustrated in FIGS. 1 to 6, the first pipe section 2 is in the form of a moulded straight pipe fitting having a hollow cylindrical body 10 defining a passage through which fluid such as, for example, water can flow. Again, for clarity of description, the embodiments described herein will be made with reference to water pipe applications. However, it is to be appreciated that the pipe fitting system is not limited to fluid flow applications, but could be advantageously used in a range of other applications including with, for example, pipes through which data and energy is transferred.

The first connector 4 is integrally formed with the body of the first pipe section as a one-piece unit. The second pipe section 3 is in the form a moulded straight pipe fitting having a hollow cylindrical body defining a passage through which fluid such as, for example, water can flow. The second connector 5 is integrally formed with the body of the second pipe section as a one-piece unit.

The first and second pipe sections (2, 3) are preferably formed from a substantially rigid thermoplastic material such as, for example, polyvinylchloride (PVC).

As is most clearly seen in FIG. 6, the first connector 4 and the second connector 5 are configured such that, when the first pipe section 2 and the second pipe section 3 are connected together, via the connecting means, the male end 6 of the first pipe section 2 is partially received within the female end 8 of the second pipe section 3 to form a pipeline. In this arrangement the first and second pipe sections (2, 3) are connected together in mating end-to-end relation.

In the embodiment of FIGS. 1 to 6, the first connector is in the form of four spaced apart protrusions in the form of studs 11 extending radially from the outer surface 7 of the male end 6 of the first pipe section 2. In the illustrated embodiment, the studs 11 are circumferentially arranged and evenly spaced about the outer surface 7 of the male end 6.

It will be appreciated that the number of studs used to form the first connector is not limited to four, but rather the number of studs can be selected to suit the particular application in which the pipe fitting system is to be employed. For example, the number of protrusions may be selected depending on the size and/or shape of the pipe fitting sections, or to provide desired structural characteristics to the joint connection between the first and second pipe section. It has been found that a greater number of protrusions can provide advantages in terms of enhanced reliability of sealing and structural stability at the connection between two pipe sections.

Figure 8A:
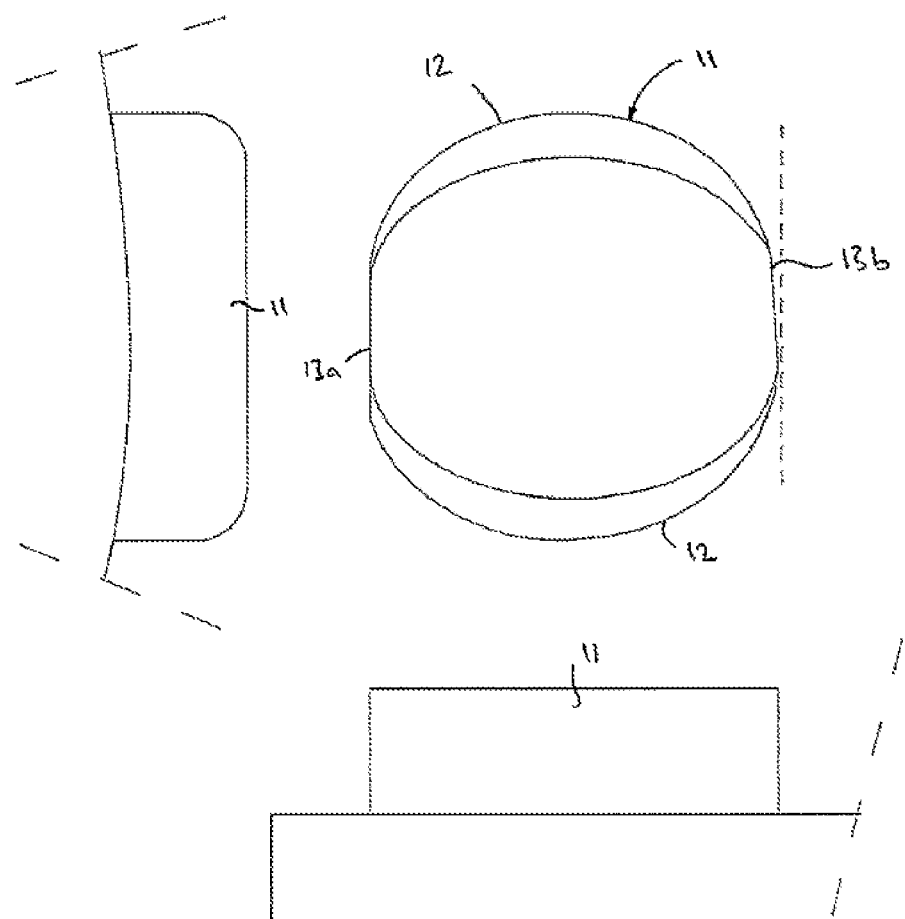
FIGS. 8A and 8B show enlarged plan views of a stud of the first connector and a recess of the second connector.
Figure 8B:
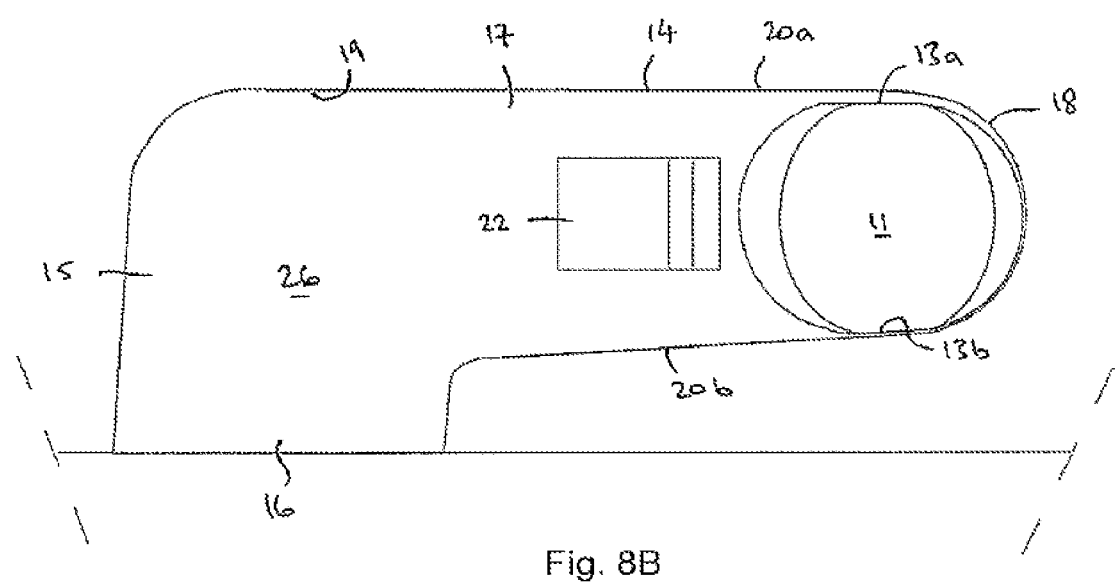
Figure 10A:
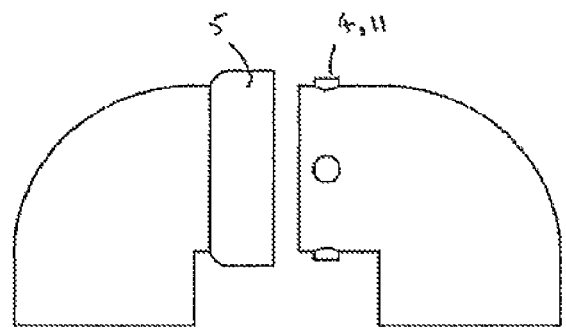
FIGS. 10A to 10F show various embodiments of angled pipe sections employing the first and/or second connectors.
Figure 10B:
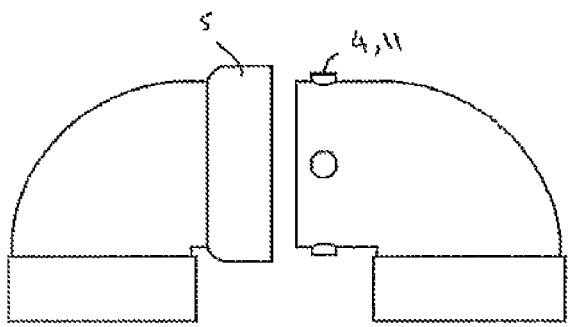
Figure 10C:
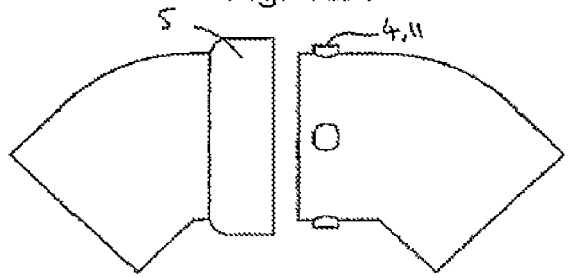
Figure 10D:
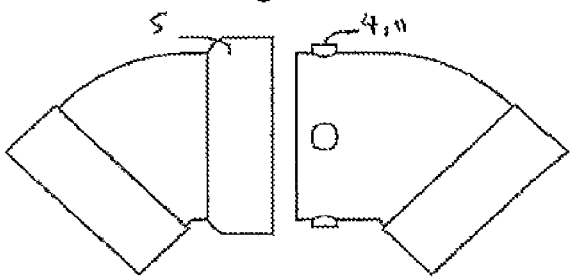
Figure 10E:
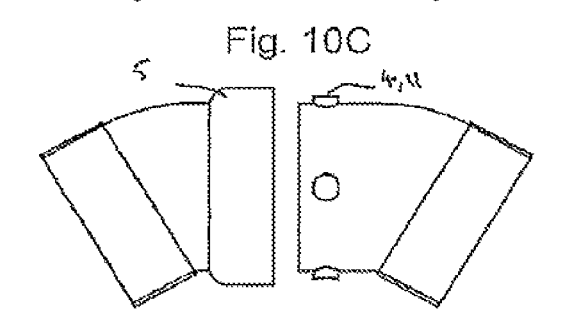
Figure 10F:
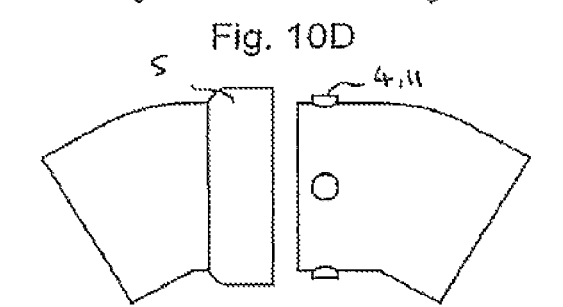
Figures 11A, 11B, 11C, 11D:
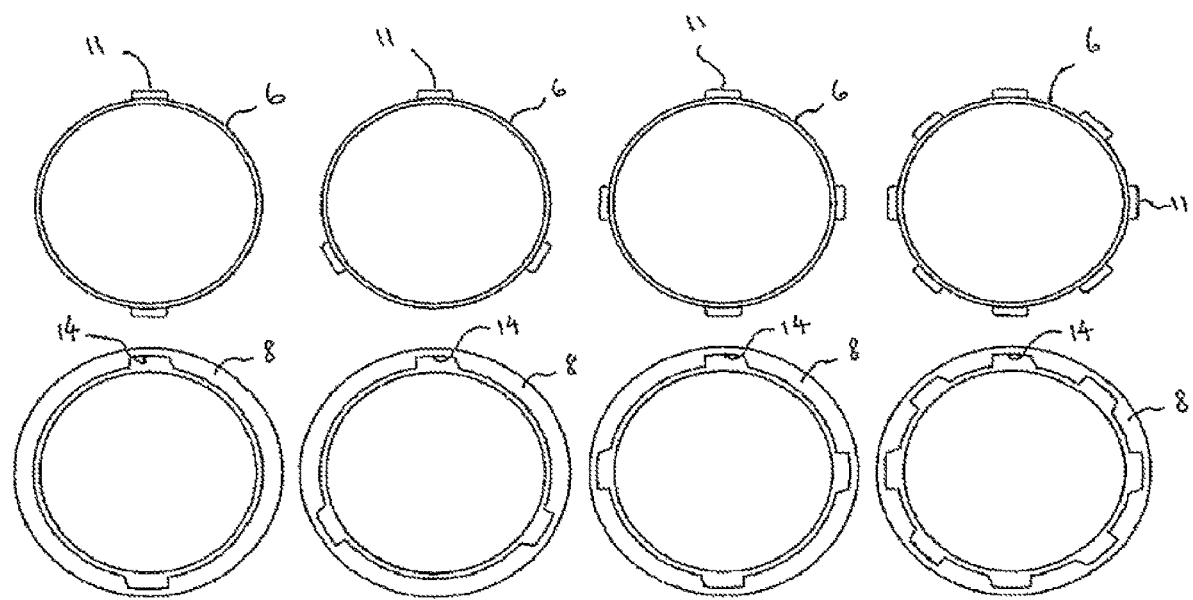
FIGS. 11A to 11D shows pairs of male and female connectors having two, three, four and eight protrusions and recesses, respectively.

As is best seen in FIGS. 1 and 8, each stud 11 protrusion has a generally obround cross-sectional profile, having rounded ends 12 and a generally flat side faces 13. The flat side edges 13 are advantageously configured to extend at an angle with respect to each other. With reference to FIGS. 8A and 8B, the flat side edge 13a furthest from the free edge of the male end 6 is substantially parallel to the free edge, and the flat edge 13b closest to the free edge is angled relative to the free edge. As is described in further detail below, the angled flat edge 13b facilitates driving the first and second pipe sections towards each other upon relative rotational motion, when connecting the two pipe sections together.

As is most clearly shown in FIGS. 1 and 5, the studs 11 of the first connector 4 are spaced back from the free edge of the male end 6 to provide a continuous uninterrupted edge/face that can abut a portion of the female end, when the two pipe sections are connected.

Referring to FIGS. 1 and 5, the second connector 5 includes four receiving formations in the form of generally L-shaped recesses 14 arranged on the inner surface 9 of the female end 8 of the second pipe section 3. Each recess 14 is adapted to releasably receive a corresponding stud 11 of the first connector 4. As such, the studs 11 and recesses 14 advantageously form four discrete pairs of studs and recesses.

Referring to FIG. 5, each recess 14 is an open-ended recess having a first arm segment 15 extending from an opening 16 at a free end face of the female end 8 of the second pipe section 3. A second arm segment 17 extends transversely from a distal end of the first arm segment 15 to a closed end 18.

Referring to FIG. 8B, the free open end 16 of the first arm segment 15 enables the respective stud 11 to be received within the recess 14, upon relative axial movement between the first and second pipe sections (2, 3) towards one another.

The extent of axial movement is limited by an innermost side wall 19 of the second arm segment 17 which extends transversely to the first arm segment 15.

The second arm segment 17 extends a predetermined distance in a generally circumferential direction along the inner surface 9 of the female end 8 of the second pipe section 3, thereby facilitating relative rotational movement between the first and second pipe sections when the stud 11 is received within the second arm segment 17 of the recess 14. The closed end 18 of the second arm segment 17 limits the extent of rotational movement between the first and second pipe sections (2, 3), and defines an engaged position where the two pipe sections are releasably connected together.

As is most clearly shown in FIG. 8B, the closed end 18 of the second arm segment 17 of the recess 14 is configured to be of complementary shape to that of the respective end 12 of the stud 11.

Referring to FIGS. 5 and 8, the second arm segment 17 has side edges 20 which are angled with respect to each other. In the illustrated embodiment, the side edge 20a of the second arm segment 17 furthest from the free end of the second pipe section 3 is substantially parallel to the free end. The side edge 20b closest to the free end is angled relative to the free edge and side edge 20a. The angled side edge 20b of the second arm segment 17 is advantageously angled so as to complement the angled side edge 13b of the stud 11. Advantageously, the angled side edge 20b is not parallel to the angled side edge 13b such that upon insertion towards the engaged position, the forward or innermost end of side 13b engages or mates with the angled side edge 20b, whilst the rear end of side 13b is spaced from edge 20b. This relative angle configuration provides advantages in terms of reducing the degree of friction between the two edges (13b, 20b) when they are engaged and sliding relative to each other. It also provides advantages in terms of favourable wear characteristics of the stud which improve the working life of the stud 11.

The complementary angled faces of the stud 11 and recess 14 enable substantially face-to-face sliding engagement between side edges (13b, 20b) during relative rotation of the first and second pipe sections when connecting the section together. Due to the orientation of the angled side edges (13b, 20b) and the sliding engagement therebetween, the side edges (13b, 20b) act on one another such that, upon relative rotation between the first and second pipe sections (2, 3), the first and second pipe sections are positively driven towards another in an axial direction. It will be appreciated that the positive driving action advantageously facilitates in achieving a sealing engagement between the free end face of the male end 6 of the first pipe section 2 and an inner seat 21 formed within an interior of the female end 8 of the second pipe section 3.

Referring to FIGS. 1,5, 6 and 7, each recess 14 has a positive locking member in the form of a locking ramp 22 for restraining the first and second pipe sections (2, 3) against rotational displacement away from the engaged position. The locking ramp 22 is arranged within the second arm segment 17 of the recess 14 so as to be spaced from the closed end 18 such that the respective stud 11 can be captively retained between the closed end 18 of the second arm segment 17 and the locking ramp 22 (i.e. in the engaged position). The spacing between the positive locking member and the closed end may be such that there may be some degree of rotational play when the stud is in the engaged position.

As most clearly seen in FIGS. 1 and 7, the locking ramp 22 has a first ramp wall 23 facing generally towards the open end 16 of the recess 14, and a second ramp wall 24 facing generally towards the closed end 18 of the recess 14.

The locking ramp has a curved or rounded peak 25 where the first and second locking ramps (23, 24) meet to facilitate ease of passage of the stud 11 past the peak 25 of the locking ramp 22, during the final stages of movement to the engaged position.

The first ramp wall 23 has a different profile to that of the second ramp wall 24 in order to provide different shaped obstructions with corresponding different levels of resistance to movement of the protrusion past the locking ramp 22.

The first ramp wall advantageously provides less resistance during connection of the first and second pipe sections, relative to the resistance provided when disconnecting the pipe sections. It will be appreciated that this difference in resistance levels is advantageous as a lower resistance when connecting pipes aids a user when installing the pipe sections in situ. A higher resistance is beneficial for the reverse procedure is it acts to inhibit undesirable inadvertent disconnection of the pipe sections.

The first ramp wall 23 extends from a floor 26 of the recess 14 to the peak 25 of the locking ramp 22 at a generally constant gradient or slope, before the curving into the peak. The second ramp wall 24 may have a steeper gradient to that of the first ramp wall. The second ramp wall 24 has a first portion 27 extending from, and generally orthogonally to, the floor 26 of the recess 14, and a second angled (bevelled, chamfered) or curved portion 28 extending into the peak 25. The chamfered or curved portion 28 acts in combination with the respective side of the rounded peak 25 of the locking ramp 22 to provide mating surfaces which enable the stud and ramp to move relative to each other when disconnecting the pipe sections.

FIGS. 7A to 7E show details of the relative positions and interactions between the stud 11 and locking ramp 22 during various sequential stages which occur when connecting the first and second pipe sections (2, 3) together. The locking ramp 22 is configured such that, upon rotational movement between first and second pipe sections (2, 3) towards the engaged position, the stud 11 abuts the first ramp wall 23, whereby further rotation causes the male end 6 carrying the stud 11 to resiliency deform (see FIGS. 7C and 7D) enabling the stud to slide along the first ramp wall 23, past the peak 25 into the engaged position. Once the stud 11 has passed the locking ramp 22 the male end 6 springs back to its original configuration such that the stud 11 is securely locked in behind the locking ramp 22.

It will be appreciated that the stud 11 and locking ramp 22 act in combination to provide a snap-locking mechanism for securely retaining the first and second pipe sections together. The snap-locking mechanism advantageously provides a tactile and/or audible signal to the user as the stud 11 engages and then moves past the locking ramp 22, indicating when the first and second pipe sections are secured in the engaged position, and when the pipe sections are released from the engaged position. For example, a user may feel the stud freely drop into the engaged position as it moves past the locking ramp. An audible click may also be detected at this time, signalling to the user that the stud is in the engaged position.

The inner surface 9 of the female end 8 of the second pipe section 3 has a stepped profile which defines the seat 21 (FIG. 16A) for limiting inward axial movement of the male end 6 of the first pipe section 2 into the female end 8.

Figure 16A:
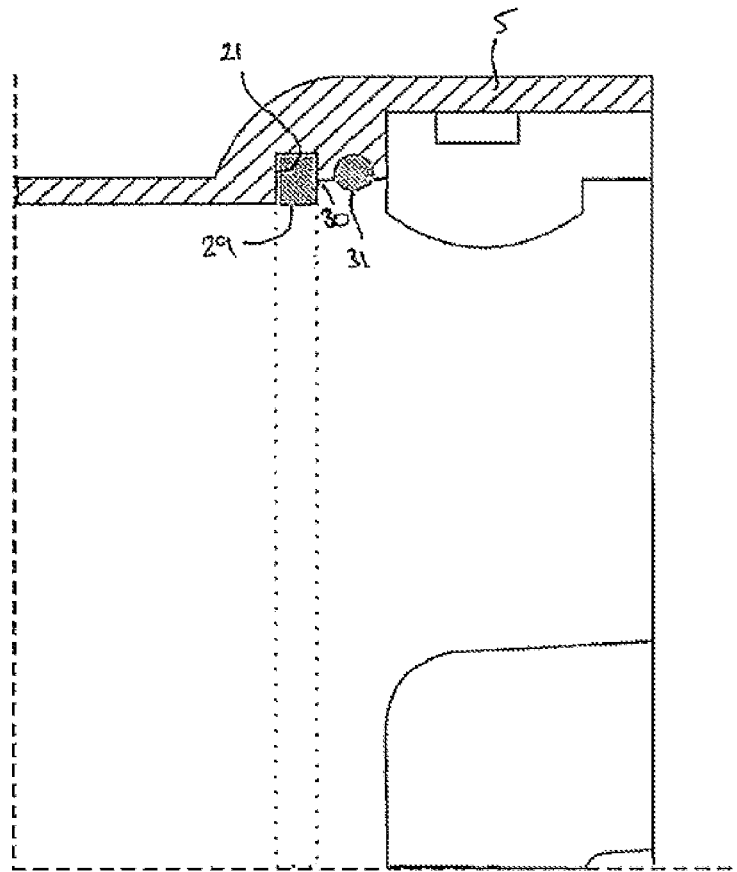
FIGS. 16A and 16B shows sectional views of a sealing mechanism of the second pipe section.
Figure 16B:
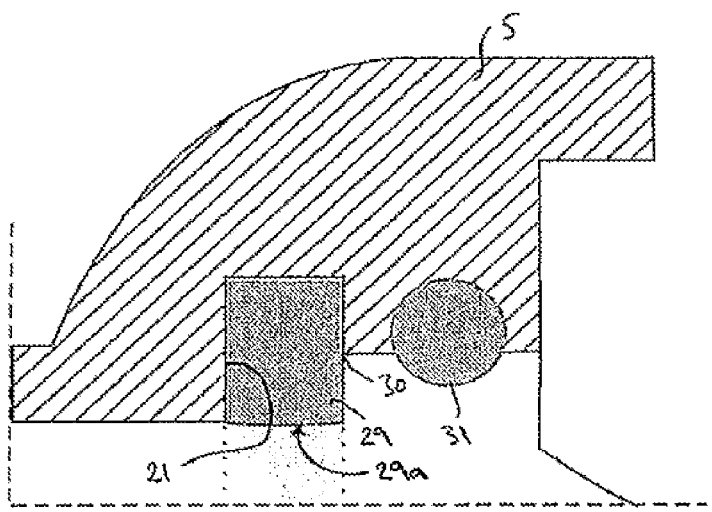

Referring to FIGS. 16A and 16B, the female end 8 of the second pipe section 2 houses a sealing means for providing a seal between the first and second pipe sections (2, 3), when the pipe sections are in the engaged position.

The sealing means includes a primary seal in the form of a compressible annular washer 29 arranged over the seat 21 within the female end 8 of the second pipe section 2. When the first and second pipe sections are connected together in the engaged position, the free end face of the male end 6 of the first pipe section 2 abuts against the washer 29 (rather than directly against the seat 21) in sealing engagement.

The female end 8 includes a seal retaining formation in the form of a circumferential groove 30 in which the washer 29 is seated. The groove 30 is complementary in shape to at least a portion of the washer. The washer 29 may advantageously have a stepped crosssection profile (e.g. L-shaped) forming a shoulder and flange (not shown) which facilitates locating and/or retaining the washer within the groove 30. In the illustrated embodiment, the washer 29 has a rounded inner surface 29a. Advantageously, the surface 29a is convexly curved to facilitate the male end retention against the washer after the stud 11 has passed the locking ramp 22. In some instances, the temporary deformation of the male end, which occurs as it passes the locking ramp, may cause the male end to partially pass into the central opening of the washer whilst bearing against the inner surface 29a. As the male end elastically returns to its undeformed shaped, the rounding of the inner surface 29a enables the male end to slide back out of the washer opening such that the washer is not dislodged and the male end can seal against the front face of the washer.

Again referring to FIGS. 16A and 16B, the sealing means also includes a secondary seal in the form of a compressible o-ring 31. The o-ring 31 may be arranged within the female end of the second pipe section and adapted to sealingly engage an outer side face of the male end of the first pipe section. The o-ring 31 is spaced from the washer 29 such that it is closer to the free end of the female end 8 of the second pipe section than the washer 29. The female end 8 has a second seal retaining formation in the form of a circumferential notch in which the o-ring is located.

The studs 11 are spaced back from the free edge of the male end to provide a continuous/uninterrupted edge/face that can abut the seat 21 or washer 29 within the female end 8, when in the engaged position.

The first pipe section 2 includes a gripping formation in the form of a continuous raised rib grip 32 extending circumferentially about the first pipe section 2. It will be appreciated that the raised rib grip 32 facilitates grasping of the first pipe section 2 during connection and disconnection with the second pipe section 3. The grip 32 enables a greater lever or turning force to be applied to the first pipe body 2.

The gripping formation is configured such that it can be used as a handgrip and/or as lever point for a mechanical lever. It is envisaged that the grip 32 (FIG. 1) may be used as a handgrip when connecting the first and second pipe sections together, and as an anchor point when disconnecting the first and second pipe sections.

Figure 3:
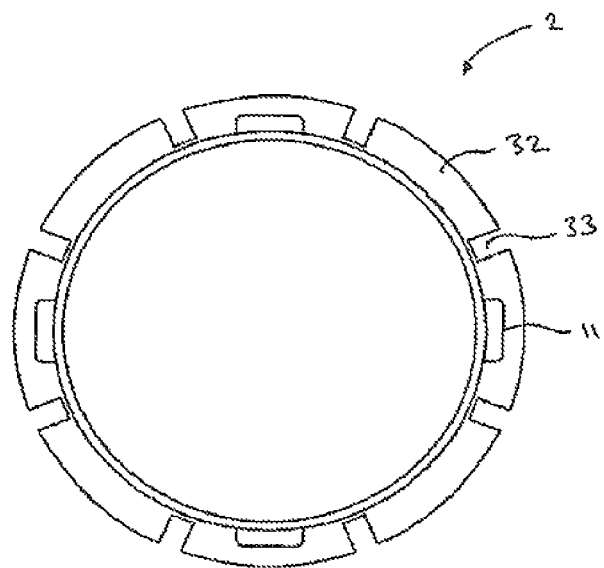
FIG. 3 shows an end view of a male end of a first pipe section with a first connector.
Figure 4:
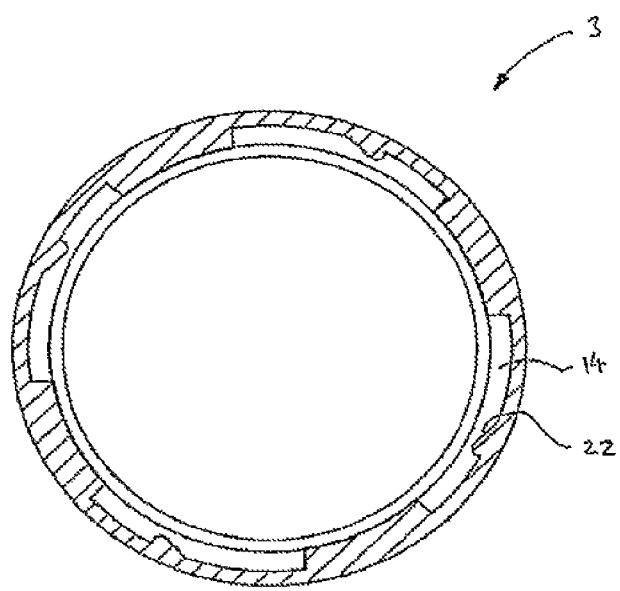
FIG. 4 shows a section view of a female end of a second pipe section with a second connector.
Figure 7A:
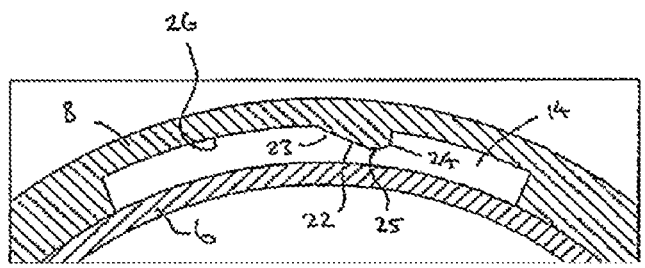
FIGS. 7A to 7E the relative positions between the first connector and the second connector during various sequential stages when connecting the first and second pipe sections together.
Figure 7B:
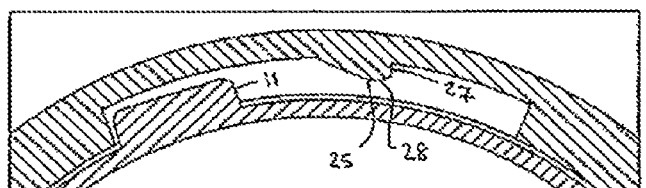
Figure 7C:
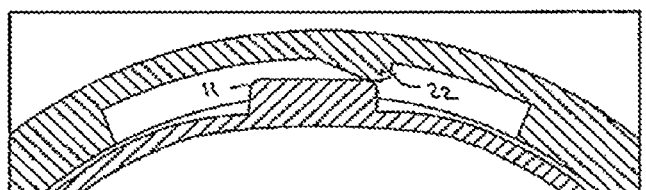
Figure 7D:
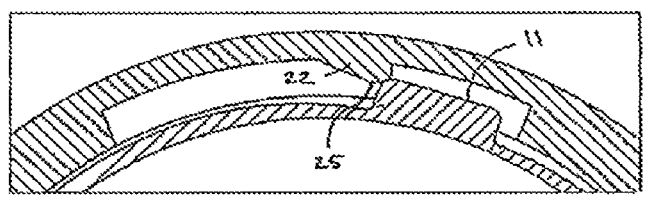
Figure 7E:
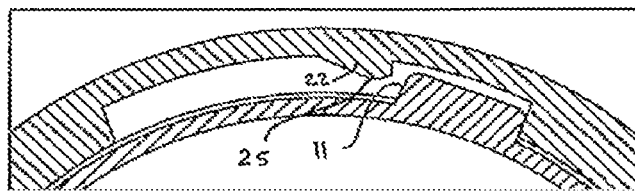

The raised rib grip 32 has a plurality of gripping elements in the form of axially extending notches 33 arranged in spaced relation about the rib 32. As best seen in FIG. 3, the grip 32 has eight gripping notches arranged symmetrically about the rib 32. The notches 33 are offset with respect to the studs 11 on the male end 6 of the first pipe section 2. It has been found that by offsetting the notches 33 with respect to the studs 11 there is less stiffening of the male end 6 of the first pipe section 2, thereby allowing the male end to resiliently deform to a sufficient extent which enables the studs to pass the respective locking ramp 22 during connection and disconnection of the first and second pipe sections (2, 3).

Figure 17:
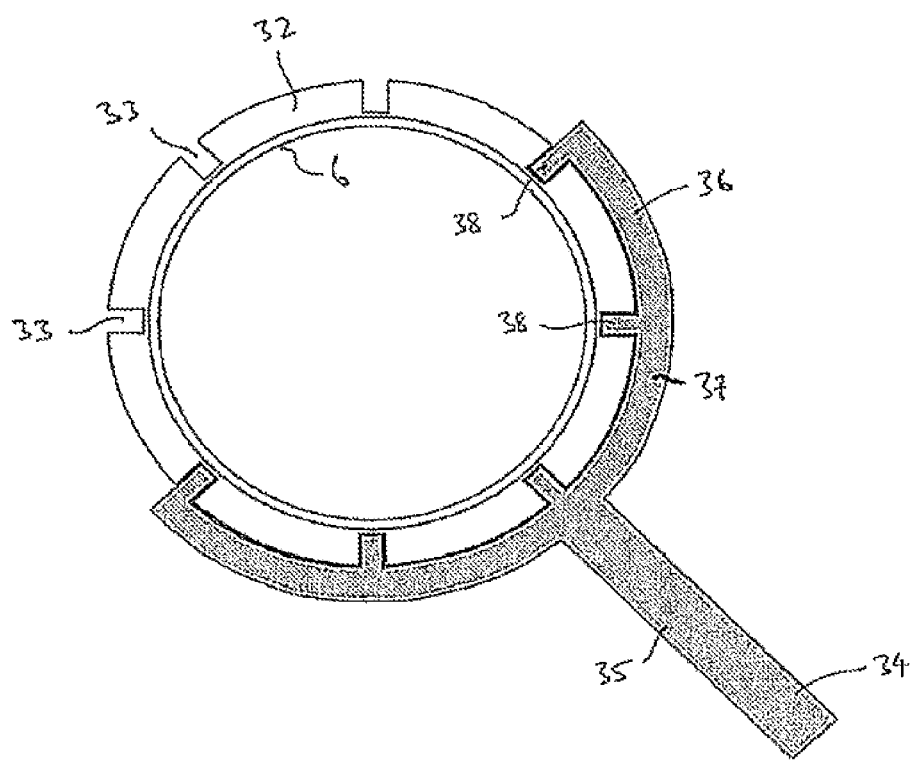
FIG. 17 shows a schematic representation of an embodiment of a mechanical lever engaging a gripping formation of the first pipe section.

FIG. 17 shows an example embodiment of a mechanical lever 34 which may be used to engage the notches 33 of the rib 32. The mechanical lever 34 has an elongate lever arm 35 with an engaging formation in the form of an engaging head 36 at its distal end for engaging at least a portion of the gripping formation. The engaging head 36 has a semicircular shaped base plate 37 which is sized and shaped to complement at least a portion of the circumferential rib 32. The base plate 37 carries five outwardly extending prongs 38 for engaging respective notches 33 in the rib It will be appreciated that the gripping formation will provide significant advantages to a wide range of embodiments, but will be particularly advantageous in those embodiments incorporating a positive locking member (e.g. locking ramp), where the positive locking member resists the free passage of the studs to and from the engaged position.

FIGS. 9A to 9K show various pipe sections which could be employed as the first and second pipe sections. One end of these pipe sections has either a first connector with studs or a second connector with recesses as described herein. The other end of these sections may also be configured to have a male end with a first connector (studs), or a female end with a second connector (recesses) as described herein (see FIGS. 9C, 9F, 9I). In other forms, the other end of the first pipe section may be configured as a slip-on fitting (male or female) which can, for example, be glued to another fitting or pipe. FIGS. 9J and 9K show examples of closed end caps with a second connector (recesses) and a first connector (studs), respectively.

FIGS. 10A to 10F shows various angled pipe sections (e.g. elbows) which could be employed as the first and second pipe sections. Again, the other end of these pipe sections may have a first or second connector as described herein, or may be configured as a slip-on fitting (male or female) which can, for example, be glued to another fitting or pipe.

FIGS. 11A to 11D shows pairs of connecting means with a male end of a first connector and a female end with a second connector in which two, three, four and eight protrusions and recesses are formed on the pipe sections, respectively. Again, it will be appreciated that the first and second connectors are not limited to these configurations which have been provided by way of example only.

It has also been found that advantages arise in connection with angular fittings where an increased number of protrusions (e.g. three or more) are arranged at the male end of the first pipe section. The increased number of protrusions provides advantages in terms of enabling a corresponding increase in the number of discrete angular increments in which the angular pipe section can be connected to the second pipe section.

Figure 12:
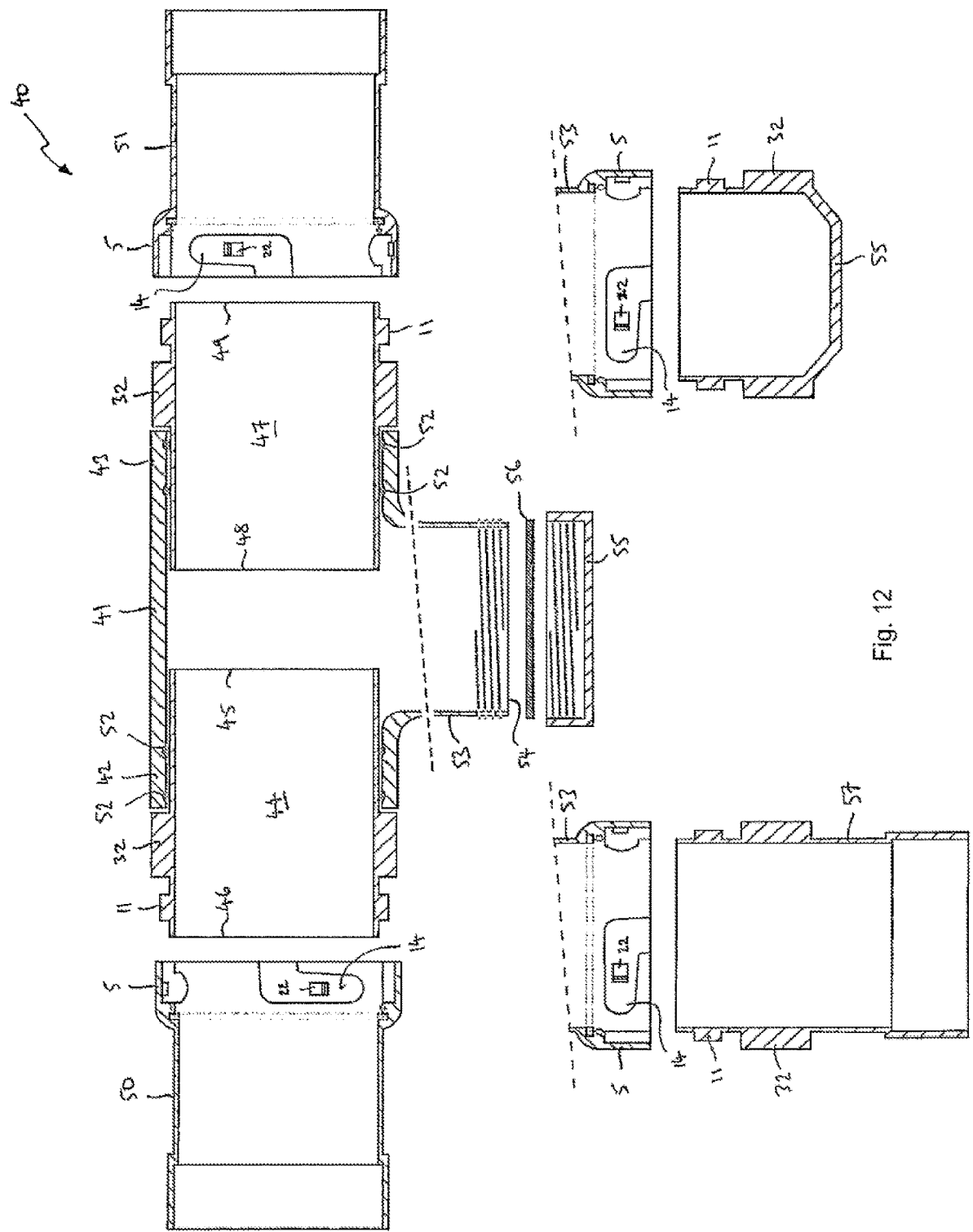
FIG. 12 shows a sectional side view of an embodiment of a pipe fitting assembly according to the invention.
Figure 13:
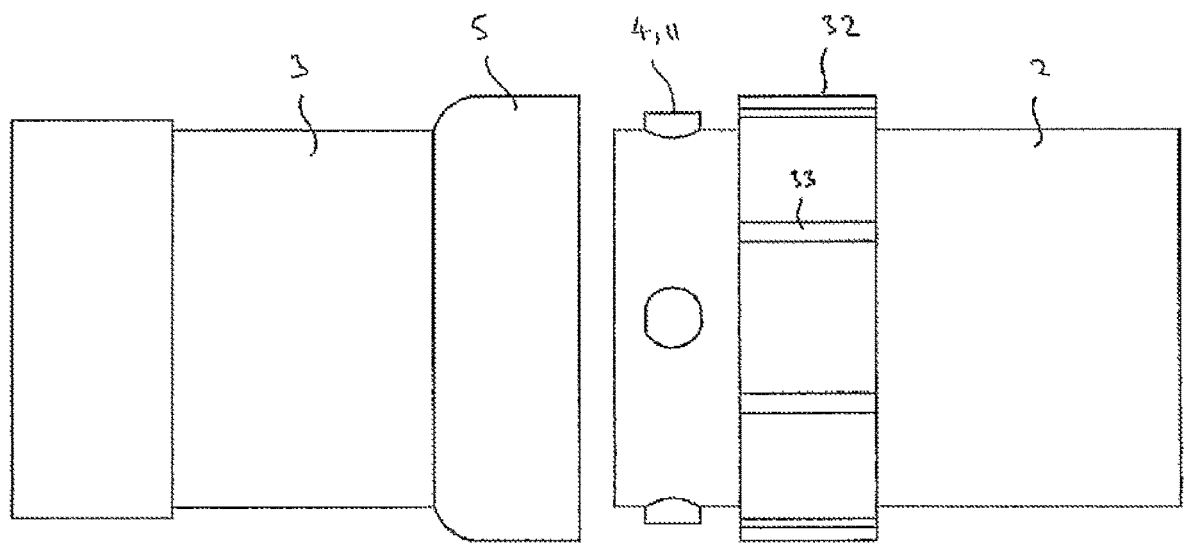
FIG. 13 shows side view of another embodiment of a pipe fitting system according to the invention in a disconnected configuration.
Figure 14:
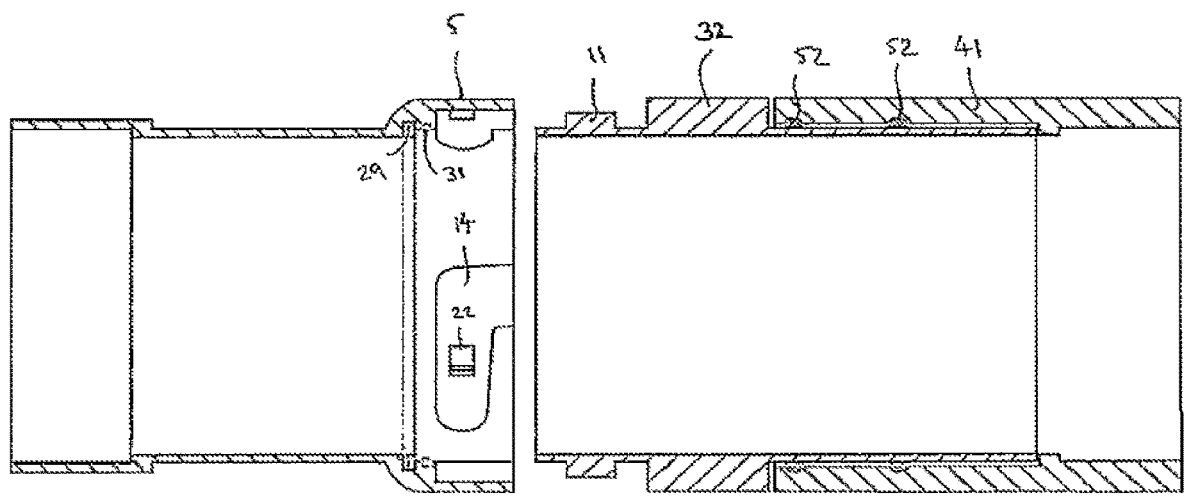
FIG. 14 shows a section view of another embodiment of a pipe fitting assembly according to the invention.
Figure 15:
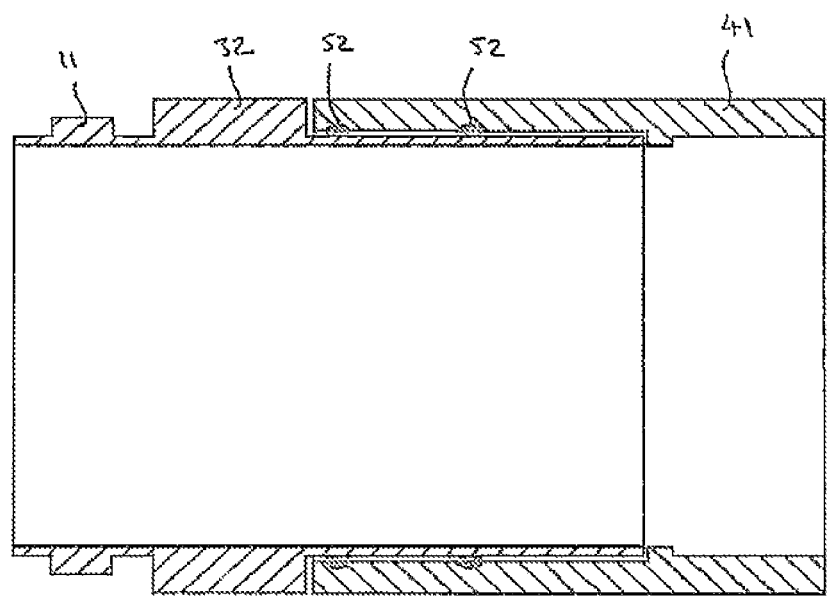
FIG. 15 shows a section view of the telescopic portion of the pipe fitting assembly of FIG. 14.

Referring to FIG. 12, the invention provides a pipe fitting assembly 40 which can be advantageously installed in a fixed pipeline to facilitate clean and efficient repair of broken pipes, to provide a means of inspection along the pipeline, and/or to enable temporary removal of pipes for maintenance, access or other purposes. The pipe fitting assembly 40 is not limited to use in repair or other retrofit applications but rather can be installed with new pipelines. The pipe fitting assembly, as with pipe fittings with first or second connectors as described herein, may be used in temporary pipeline applications at, for example, worksites.

In the embodiment of FIG. 12, the pipe fitting assembly 40 is configured as a removable assembly with a T-shaped body 41 having a first open end 42 and a second open end 43.

A first pipe member 44 having an inner end 45 and an outer end 46 is telescopically received within the first open end 42 of the body 41. The first pipe member 44 is adapted for sliding movement between a retracted position as shown in FIG. 12, and an extended position. The outer end 46 has a first connecting means for releasably connecting the first pipe member 44 to an upstream pipe section 50.

A second pipe member 47 has an inner end 48 and an outer end 49. The inner end 48 of the second pipe member 47 is telescopically received within the second open end 43 of the body 41. The second pipe member 47 is adapted for sliding movement between a retracted position as shown in FIG. 12, and an extended position. The outer end 49 has a first connecting means for releasably connecting the second pipe member 47 to a downstream pipe section 51.

The outer ends (46, 49) of the first and second pipe members (44, 47) are configured as male ends 6 such that the first connector is in the form of four spaced apart circumferentially arranged studs 11, as described herein.

The upstream and downstream pipe sections (50, 51) are configured to have at least one female end 8 to complement the male outer ends of the first and second pipe members (44, 47). The female end 8 of the upstream and downstream pipe sections have a second connector in the form of a plurality of recesses 14 for releasably engaging with the studs 11 of the respective first and second pipe members (44, 47) in the manner described herein.

The opposite end of the upstream and downstream pipe sections may be formed as a male or female end. In the embodiment of FIG. 12, the opposite end of the upstream and downstream pipe sections is formed as a slip-on female fitting which can be glued to an existing male fitting or pipe. It will be appreciated that the telescopic arrangement of the first and second pipe members enables the length between the outer ends (46, 49) of the first and second pipe members (44, 47) to be readily adjustable. This adjustability makes it possible to readily install and remove the pipe fitting assembly 40 to and from a pipeline for a range of purposes including cleaning, repair, replacement, inspection of the surrounding pipes or other maintenance and access purposes. The adjustability also makes the pipe fitting assembly 40 readily adapted for use as a pipe joiner which is particularly advantageous when repair of an existing fixed pipe is required. The section of broken pipe can be cut out and removed and replaced with the pipe fitting assembly 40. It will thus be appreciated that the pipe fitting assembly 40 itself may be removable or it may render the adjoining pipe removable while the assembly 40 is secured in place.

A sealing mechanism is arranged within the body 41 and configured to provide a seal between an inner surface of the first open end 42 of the body 41 and an outer surface of the inner end 45 of the first pipe member 44. The seal is configured to maintain the seal when the first pipe member is at or between the extended and retracted positions. In the illustrated embodiment, the seal has two sealing members arranged in spaced apart side-by-side relation. Each sealing member is in the form of an o-ring 52. The inner surface of the first open end has two retaining formations in the form of a circumferential grooves in which sealing members are seated.

A sealing mechanism is also arranged within the body 41 and configured to provide a seal between an inner surface of the second open end 43 of the body 41 and an outer surface of the inner end 48 of the second pipe member 47. The seal is configured to maintain the seal when the first pipe member is at or between the extended and retracted positions. In the illustrated embodiment, the seal has two sealing members arranged in spaced apart side-by-side relation. Each sealing member is in the form of an o-ring 52. The inner surface of the first open end has two retaining formations in the form of circumferential grooves in which sealing members are seated.

The first and second pipe members (44, 47) have a gripping formation 32 adapted to facilitate grasping of the first pipe section during connection and disconnection with the second pipe section, thereby enabling a greater lever or turning force to be applied to the first pipe body. The gripping formation of the first and/or second pipe members may be configured as a handgrip and/or adapted to provide a lever point for a mechanical lever as described herein.

The T-shaped body 41 has a leg 53 in which a third opening 54 is formed. The third opening 54 is arranged intermediate the first and second open ends. The third opening 54 advantageously provides an inspection portal for facilitating visual inspection into the main body of the pipe fitting assembly 40 and surrounding pipes.

A cap 55 for covering the third opening 54 is threadingly engagable with an external thread of the leg. A gasket 56 is arranged to seat between an inner surface of the cap and the leg of the body to facilitate sealing engagement therebetween. It will be appreciated that the cap 55 can be readily removed when it is desired to inspect the pipeline. Advantageously, the first open end of the body and the first pipe member (and similarly the second open end of the body and the second pipe member) are preferably configured such that the inner end of the pipe members are clear of (i.e. do not overlap) the leg of the body when the pipe members are in the extended position, such that they do not obstruct a view path of the main body from the inspection portal.

The right hand side of FIG. 12 shows an alternative embodiment in which cover/cap 55 and the third leg 53 may instead have respective first and second connectors (4, 5) for releasably attaching the cap/cover 55 to the leg 53 of the body 41 to seal the opening 54. For example, the third leg may be configured to have a female second connector as described herein, and the cap/cover has a male first connector as described herein to enable releasable connection between the cap and third leg. In this form, the cap/cover 55 may act as a plug.

The left hand side of FIG. 12 shows an alternative embodiment in which a branch line 57 may be releasably connected to the third leg 53 either directly or indirectly via a fitting as described herein, rather than a cap/cover/plug. Again, respective first and second connectors (4, 5) as described herein may be used to enable the branch line 57 to be releasably connected to the third leg 53.

Referring to FIGS. 18 to 21, another embodiment of the pipe fitting system 100 is shown in exploded form. A first pipe section 200 includes a protrusion 210 from the outside surface 220, the protrusion 210 forming part of a locking means 800. A second pipe section 300 includes a recess 310 in the inside surface 320, the recess 310 forming another part of the locking means 800. The end 230 of the first pipe section 200 forms a male connecting portion that fits inside the female connecting portion 330 of the second pipe section 300.

Referring to FIG. 19A to 19C, the embodiment of FIG. 18 is shown in an assembled or retained position. It can be seen that the protrusion 210 is inside the recess 310. The wall 350 of the recess 310 abuts the protrusion 210, thereby preventing the pipe sections 200, 300 from being separated simply by providing a tension force along the central axis 600.

In this embodiment, the protrusion 210 is set back from the edge 240 of the male connecting portion 230. This provides a continuous edge 240 that abuts the taper 340 of the female connecting portion 330 when in the retained position. The locking mechanism 800 in addition to retaining the pipe sections 200, 300 together provides a force that allows this edge 240 and taper 340 to create a watertight seal.

To separate the pipe sections 200, 300 they must first be rotated relative to one another so that the protrusion 210 moves along the axis 610 of the lateral portion of the recess 310. The pipe sections 200, 300 can then be separated by pulling the pipes apart in a longitudinal direction 600.

In the embodiment of FIGS. 18 and 19, the recess 310 is an L-shaped channel, however other suitable shapes should also be considered to be part of the present invention. For example, the channel could have an angle greater than 90 degrees, where the portion of the channel 310 currently aligned with the axis 600 is at an angle to the axis 600. This would then require the male portion 200 to be rotated in a direction opposite to the locking direction as it is first inserted into the female portion 300. Similarly, the section of the channel 310 aligned with the axis 610 could be angled to provide a more secure lock, preventing accidental disconnection.

As previously described, while the embodiment of FIGS. 18 and 19 is shown with two sets of locking means 800, it will be appreciated by those skilled in the art that any suitable number may be used. A greater number of locking means 800 may be advantageous for providing a stronger connection. Alternatively, a single locking means 800 may be sufficient if located at the top of the pipe sections so that gravity retains the bottom portion in place without the need of a locking means 800.

Figure 21B:
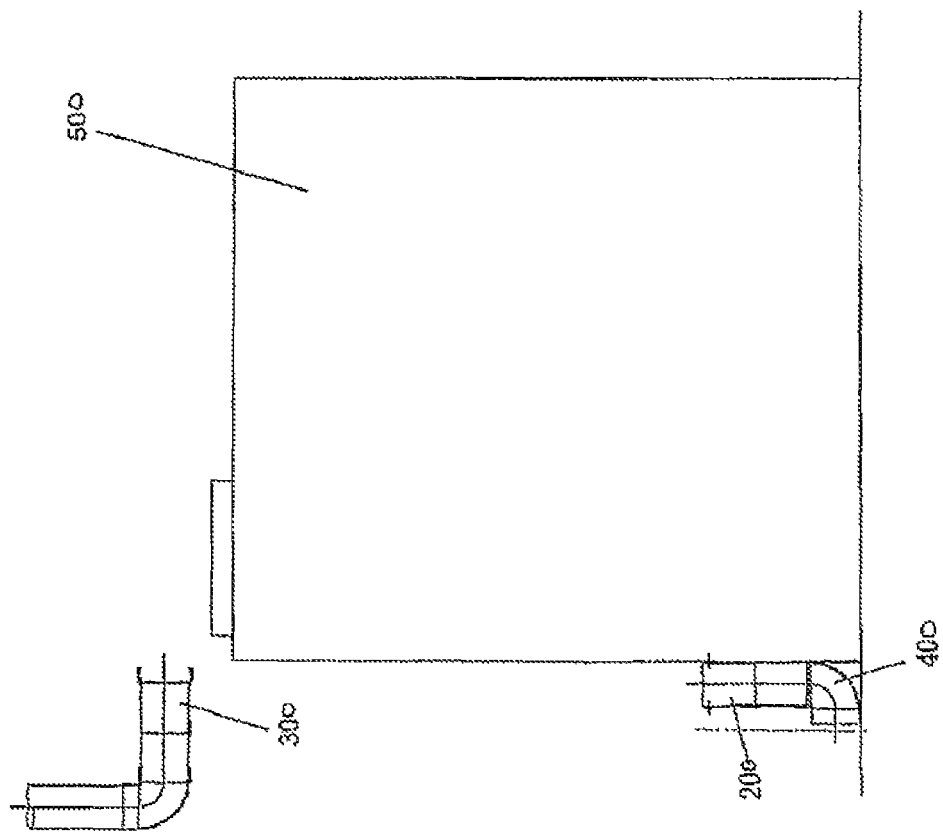
FIGS. 21A and FIG. 21B show the pipe connection in use, where
Figure 21A:
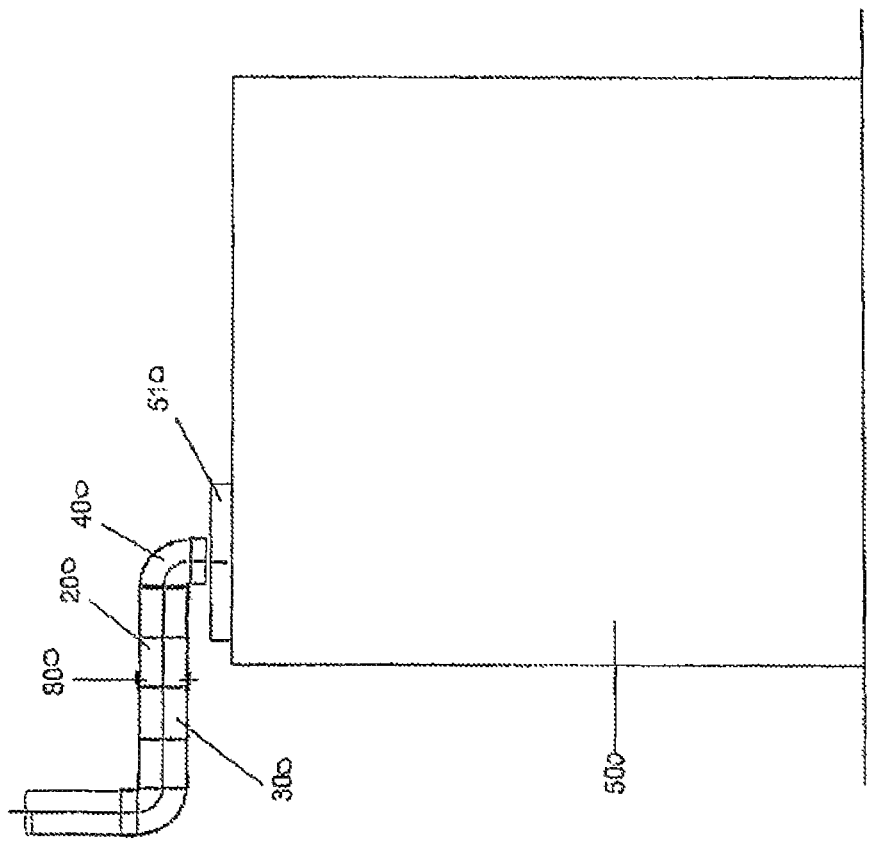

The pipe bend 400 is typically used to improve the flow of water from the stormwater piping system to a water tank, such as the in the setup illustrated in FIG. 21A. The join 450 shown in FIGS. 19A and 19B is a standard pipe join. Such a join would typically be glued to retain the sections of pipe to one another and to prevent leaking.

Referring to FIGS. 20A to 20C, an alternative embodiment of the pipe fitting system is shown. In this embodiment, the system includes an O-ring 360 to aid in sealing the connection. The taper 340 shown in FIG. 19B is now formed as a step defining a seat in front of the edge 240, with the O-ring 360 sitting between the step and the edge 240 of the male sealing portion. The dimensions of various other parts, including the recess 310 and the protrusion 210, have now changed compared to those shown in FIGS. 19A to 19C. It should be understood that the particular dimensions are not critical to the invention, with either dimensions or any other sizes being suitable to either the taper or O-ring sealing versions of the invention. Various other sealing methods may also be used in place of the O-ring, such as different forms of washers and gaskets. However, as described herein, the dimensions should be such that a degree of resilient deformation can occur at the pipe ends during connection and disconnection of the pipe sections (see the sequence shown in FIG. 7). For example, the wall thickness of the pipe sections should not be so thick that its prevents the pipe sections from being able to resiliency deform in this manner.

Referring to FIGS. 21A and 21B, a pipe fitting system 100 is shown in use with a water tank 500. FIG. 21A shows the system 100 in the retained position. FIG. 21B shows a section of the pipe (200, 400) placed on the ground after it has been disconnected from portion 300 to allow unrestricted access to the opening 510 of the water tank 500.

It will be appreciated that the invention in its various aspects and preferred embodiments provides a number of advantages. In its preferred embodiments, the present invention advantageously provides a robust pipe fitting system and assembly that allows reliable, fast, clean and repeated connection and disconnection of pipe sections, as and when required.

Preferred embodiments of the pipe fitting system advantageously facilitate end of line connections to provide unrestricted access to a work area requiring regular routine maintenance; for example, a drain or a strainer over an inlet to a water tank. Embodiments of the pipe fitting system and assembly can also advantageously facilitate clean and efficient repair or replacement of fixed existing pipes, including not only end of line sections but intermediate pipe sections. Temporary removal of pipes for maintenance or access purposes is also advantageously facilitated by embodiments of the pipe fitting system and assembly.

Embodiments of the pipe fitting system provide the ability to remove sections of storm water pipe for access to the water tank and then to be able to replace the pipe work back to its working status without having to cut and glue sections. The pipe work is left in its usable state and readily available for disconnection if and when required.

The connecting means of the pipe fitting system may also find use in a wide range of applications, not involving water tanks. For example, other stormwater systems may benefit from using a similar connection to provide access to other types of drains or gutters. The connection may also be used with other types of pipes, such as water pipes other than stormwater, exhaust chimneys, other types of ducting and any other type of pipe where fast and repeated disconnection of a section is desired.

In these and other respects, the invention represents a practical and commercially significant improvement over the prior art.

Although the invention has been described with reference to specific examples, it will be appreciated by those skilled in the art that the invention may be embodied in many other forms. It should also be understood that the various aspects and embodiments of the invention as described can be implemented either independently, or in conjunction with all viable permutations and combinations of other aspects and embodiments. All such permutations and combinations should be regarded as having been herein disclosed.

The invention claimed is:

1. A pipe fitting system, including:
    a first hollow pipe section having at least one male end with a first connector, the first connector having two or more protrusions extending outwardly from an outer surface of the male end of the first pipe section;
    a second hollow pipe section having at least one female end with a second connector, the second connector having two or more generally L-shaped receiving formations associated with an inner surface of the female end of the second pipe section, the L-shaped receiving formations having a first arm segment extending axially from an opening at a free end face of the female end of the second pipe section, and a second arm segment extending transversely from a distal end of the first arm segment to a closed end, the L-shaped receiving formations being formed so as to have no impact on the profile of the outer surface of the second connector of the female end of the second pipe section, whereby the second connector has a smooth, cylindrical outer surface profile, the receiving formations being adapted to releasably receive and engage a respective protrusion of the first connector;

a positive locking member arranged within the second arm segment of each receiving formation, each positive locking member extending from a substantially central region of a floor of the associated second arm segment and being spaced from the closed end such that the associated protrusion of the first connector can be captively retained between the closed end of the second arm segment and the positive locking member to releasably restrain the first and second pipe sections against rotational displacement away from an engaged position, wherein the positive locking member includes a locking ramp having a first ramp wall facing generally towards the open end of the recess, and a second ramp wall facing generally towards the closed end of the recess, and wherein the second ramp wall has a steeper gradient relative to that of the first ramp wall such that the first ramp wall provides less resistance during connection of the first and second pipe sections relative to the resistance provided by the second ramp wall during disconnection of the first and second pipe sections;

a primary seal seated within a first seal retaining formation formed within the female end of the second pipe section, the primary seal being resiliently compressible and adapted to sealingly engage a free end face of the male end of the first pipe section; and a secondary seal seated within a second seal retaining formation formed within the female end of the second pipe section, the secondary seal being resiliently compressible and adapted to sealingly engage an outer side face of the male end of the first pipe section, wherein the free end face and the outer side face are substantially orthogonal to one another;

wherein, the first connector and the second connector form a connecting means for releasably connecting the male end of the first pipe section and the female end of the second pipe section together such that, when the first pipe section and the second pipe section are connected together, the male end of the first pipe section is at least partially received within the female end of the second pipe section.

2. A pipe fitting system according to claim 1, wherein the first pipe section is a straight pipe fitting or an angled pipe fitting, and the second pipe section is a straight pipe fitting or an angled pipe fitting.

3. A pipe fitting system according to claim 1, wherein the first connector is spaced back from the free end face of the male end of the first pipe section to provide a continuous abutment edge.

4. A pipe fitting system according to claim 1, wherein each protrusion has generally flat side faces which extend in a circumferential direction around the outer surface of the male end of the first pipe section.

5. A pipe fitting system according to claim 4, wherein the flat side edges are angled with respect to each other.

6. A pipe fitting system according to claim 5, wherein the flat side edge closest to the free end face of the male end is substantially parallel to the free end face and the flat edge furthest from the free end face extends at an angle relative to the free end face.

7. A pipe fitting system according to claim 6, in which each receiving formation is a generally L-shaped recess, and wherein side edges of the second arm segment are angled with respect to each other.

8. A pipe fitting system according to claim 7, wherein the side edge of the second arm segment furthest from a free end of the second pipe section is substantially parallel to the free end, and the side edge closest to the free end is angled relative to the free end, thereby enabling sliding engagement with the angled face of the protrusion when the first and second pipe sections are rotated relative to one another.

9. A pipe fitting system according to claim 7, wherein the angled side edge of each second arm segment is configured to act on the respective protrusion of the first connector such that, upon relative rotation between the first and second pipe sections, the first and second pipe sections are positively driven towards one another in an axial direction.

10. A pipe fitting system according to claim 1, wherein the locking ramp is configured such that, upon rotational movement between first and second pipe sections towards the engaged position, the protrusion abuts the first ramp wall, whereby further rotation causes the male end carrying the protrusion to resiliently deform enabling the protrusion to slide along the first ramp wall, and past the locking ramp into the engaged position.

11. A pipe fitting system according to claim 1, wherein the first pipe section includes a gripping formation for facilitating grasping of the first pipe section during connection and disconnection with the second pipe section, thereby enabling a greater turning force to be applied to the first pipe body.

12. A pipe fitting system according to claim 11, wherein the gripping formation is configured as a continuous band extending circumferentially about the first pipe section, and having a plurality of gripping elements.

13. A pipe fitting system according to claim 1, wherein the first pipe section comprises a body having a first open end and a second open end; and a first pipe member having an inner end and an outer end defining the male end on which the first connector is formed;

wherein, the inner end of the first pipe member is telescopically received within the first open end of the body and adapted for sliding movement between a retracted position and an extended position.

14. A pipe fitting system according to claim 13, wherein a second pipe member is telescopically received within the second open end of the body and adapted for sliding movement between a retracted position and an extended position, wherein a male outer end of the second pipe member has a first connector with two or more outwardly extending protrusions for releasably connecting the second pipe member to a female end of a downstream or upstream pipe section in which two or more generally L-shaped receiving formations are formed on its inner surface.

15. A pipe fitting system according to claim 13, wherein a sealing mechanism is arranged between the first open end of the body and the inner end of the first pipe member.

16. A pipe fitting system according to claim 15, wherein the sealing mechanism is configured to provide a seal between an inner surface of the first open end of the body and an outer surface of the inner end of the first pipe member, the seal mechanism being adapted to maintain a seal when the first pipe member is at or between the extended and retracted positions.

17. A pipe fitting system according to claim 13, wherein the body is a T-shaped pipe section having a main body section in which the first and second open ends are formed, and a leg extending transversely from the main body and in which a third opening is formed.

\* \* \* \* \*